(12) United States Patent
Nomura et al.

(10) Patent No.: US 12,737,044 B2
(45) Date of Patent: Sep. 15, 2026

(54) INFORMATION PROCESSING DEVICE, CONTROLLER DISPLAY METHOD, AND COMPUTER PROGRAM

(71) Applicant: Sony Interactive Entertainment Inc., Tokyo (JP)

(72) Inventors: Masanori Nomura, Tokyo (JP); Yurika Mulase, Tokyo (JP); Kyo Suzuki, Tokyo (JP); Shoji Watanabe, Tokyo (JP); Shizuka Ohara, Tokyo (JP); Shoi Yonetomi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/870,464

(22) PCT Filed: May 25, 2023

(86) PCT No.: PCT/JP2023/019468
§ 371 (c)(1),
(2) Date: Nov. 29, 2024

(87) PCT Pub. No.: WO2023/238678
PCT Pub. Date: Dec. 14, 2023

(65) Prior Publication Data

US 2025/0306678 A1 Oct. 2, 2025

(30) Foreign Application Priority Data

Jun. 6, 2022 (JP) ................................ 2022-091709

(51) Int. Cl.
*G06F 3/01* (2006.01)
*G02B 27/01* (2006.01)
(Continued)

(52) U.S. Cl.
CPC ................ *G06F 3/014* (2013.01); *G06T 7/70* (2017.01); *G06T 11/00* (2013.01)

(58) Field of Classification Search
None
See application file for complete search history.

(56) References Cited

U.S. PATENT DOCUMENTS 10,713,001 B2 7/2020 Tamaoki et al.
11,070,724 B2 7/2021 Ihara et al.
(Continued)

FOREIGN PATENT DOCUMENTS

JP 2015-232783 A 12/2015
JP 2016-158795 A 9/2016
(Continued)

OTHER PUBLICATIONS

International Search Report and Written Opinion mailed on Jul. 4, 2023, received for International Application No. PCT/JP2023/019468, filed on May 25, 2023, 8 pages including English Translation.

(Continued)

*Primary Examiner* — Carl Adams
(74) *Attorney, Agent, or Firm* — Kilpatrick Townsend & Stockton LLP

(57) ABSTRACT

A captured image obtaining section obtains a captured image resulting from capturing in a front direction of a user wearing a head-mounted display (HMD). An estimation processing section estimates the position of an input device on the basis of the captured image in which a controller (input device) including a gripping portion to be gripped by the user after the user inserts a hand through a curved portion appears. A display control section displays the captured image resulting from capturing in the front direction of the user on the HMD. The display control section further
(Continued)

displays an object indicating a part to be gripped by the user together with the captured image on the basis of an estimation result of the position of the input device.

18 Claims, 15 Drawing Sheets

(51) Int. Cl.

| | |
|---|---|
| ***G06T 7/70*** | (2017.01) |
| ***G06T 11/00*** | (2006.01) |
| ***H04N 21/422*** | (2011.01) |

(56) References Cited

U.S. PATENT DOCUMENTS

| | | | | |
|---|---|---|---|---|
| 2014/0049558 | A1* | 2/2014 | Krauss | H04N 21/42208 345/633 |
| 2018/0246326 | A1 | 8/2018 | Moon et al. | |
| 2022/0163800 | A1* | 5/2022 | Yokokawa | G02B 27/0172 |
| 2023/0191243 | A1 | 6/2023 | Nokuo et al. | |
| 2024/0094831 | A1* | 3/2024 | Wang | G06F 3/013 |

FOREIGN PATENT DOCUMENTS

| | | | |
|---|---|---|---|
| JP | 2017058528 | A | 3/2017 |
| JP | 2017184048 | A | 10/2017 |
| WO | 2018173791 | A1 | 9/2018 |
| WO | 2021240930 | A1 | 12/2021 |

OTHER PUBLICATIONS

EP23819661.2, “Extended European Search Report,” May 4, 2026, 9 pages.

JP2022-091709, “Office Action,” May 19, 2026, 4 pages.

* cited by examiner

RECORDING DEVICE
11
INFORMATION PROCESSING DEVICE
10
AP
17
2
15
1
16
16
14
14
100

122
STORAGE UNIT
124
IMU
126
MICROPHONE
14
IMAGING DEVICE
120
CONTROL UNIT
128
COMMUNICATION CONTROL UNIT
130
DISPLAY PANEL
130a
DISPLAY PANEL FOR LEFT EYE
130b
DISPLAY PANEL FOR RIGHT EYE
132
AUDIO OUTPUT UNIT
100

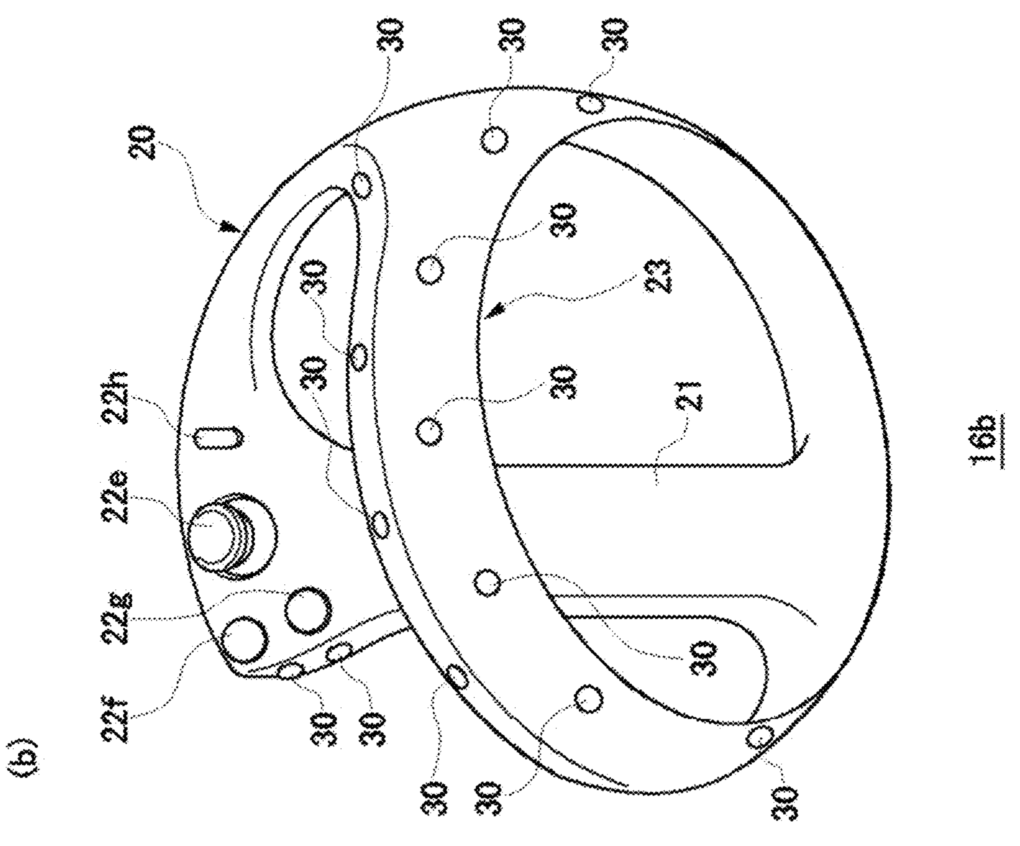
(b)
20
21
22e
22f
22g
22h
23
30
16b
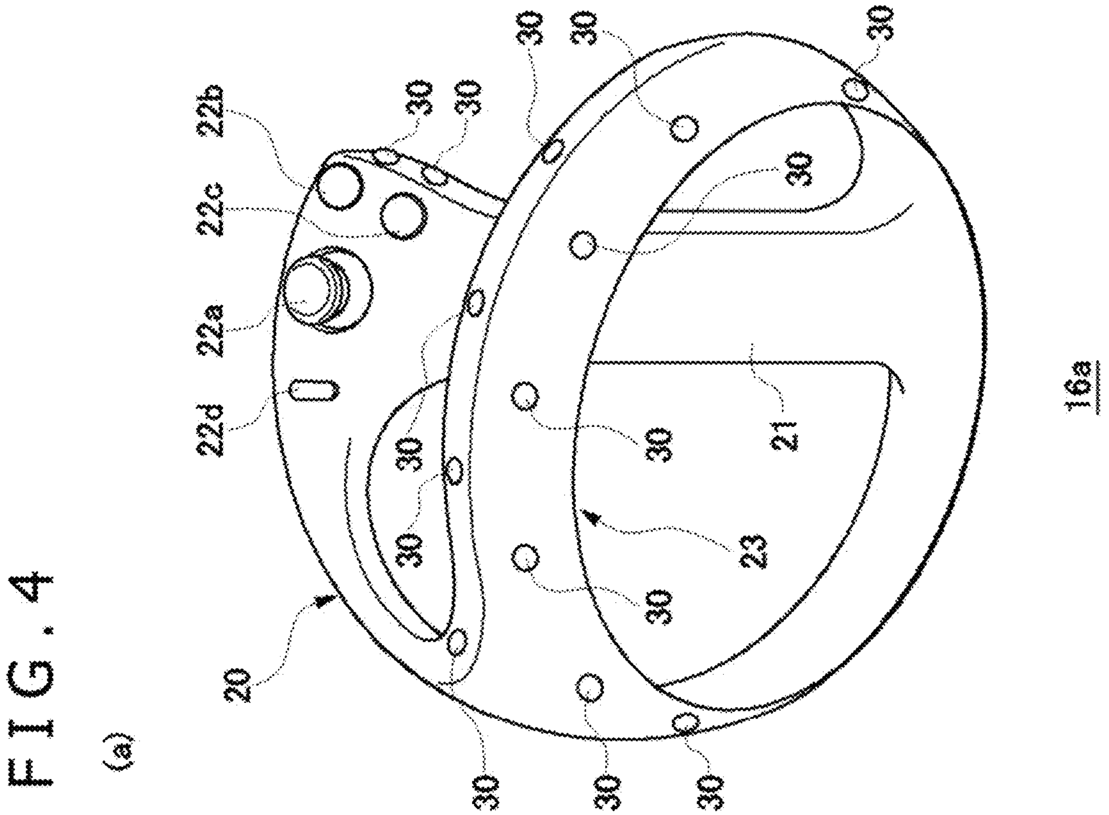
FIG. 4
(a)
20
21
22a
22b
22c
22d
23
30
16a

14

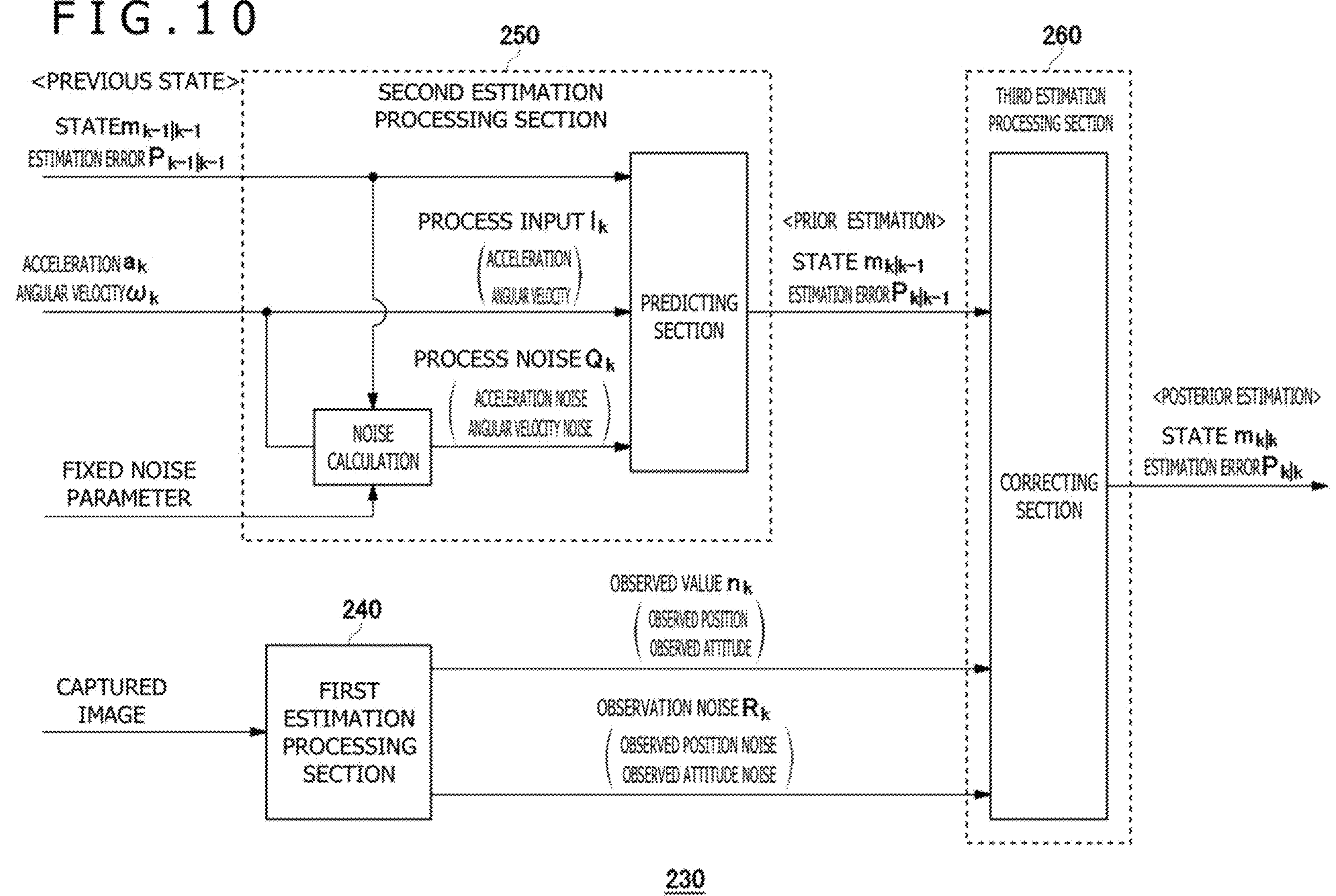
FIG. 10
<PREVIOUS STATE>
STATE $m_{k-1|k-1}$
ESTIMATION ERROR $P_{k-1|k-1}$
ACCELERATION $a_k$
ANGULAR VELOCITY $\omega_k$
FIXED NOISE PARAMETER
CAPTURED IMAGE
250
SECOND ESTIMATION PROCESSING SECTION
PROCESS INPUT $l_k$
(ACCELERATION ANGULAR VELOCITY)
PROCESS NOISE $Q_k$
(ACCELERATION NOISE ANGULAR VELOCITY NOISE)
NOISE CALCULATION
PREDICTING SECTION
240
FIRST ESTIMATION PROCESSING SECTION
<PRIOR ESTIMATION>
STATE $m_{k|k-1}$
ESTIMATION ERROR $P_{k|k-1}$
OBSERVED VALUE $n_k$
(OBSERVED POSITION OBSERVED ATTITUDE)
OBSERVATION NOISE $R_k$
(OBSERVED POSITION NOISE OBSERVED ATTITUDE NOISE)
260
THIRD ESTIMATION PROCESSING SECTION
CORRECTING SECTION
<POSTERIOR ESTIMATION>
STATE $m_{k|k}$
ESTIMATION ERROR $P_{k|k}$
230

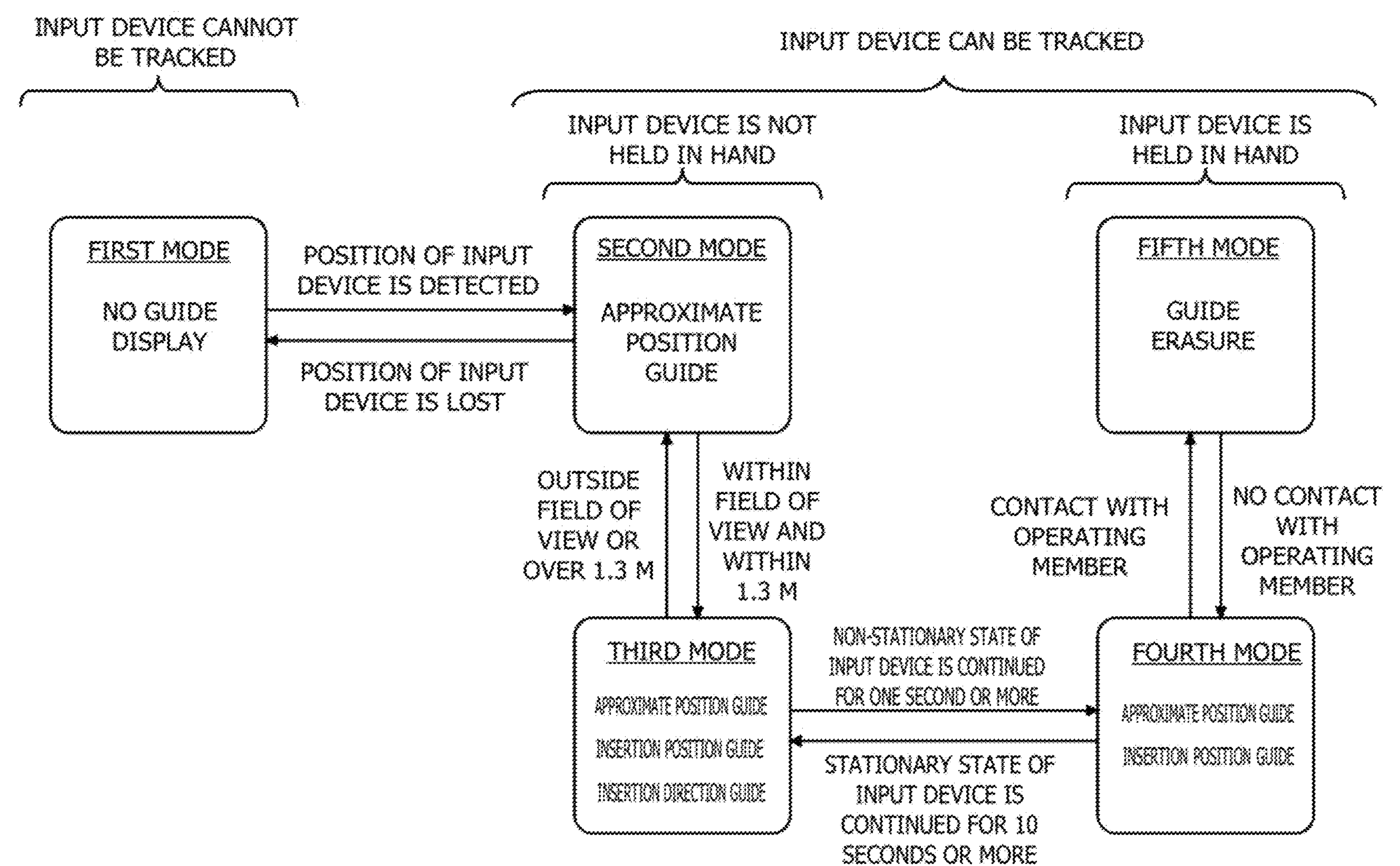
FIG. 11
INPUT DEVICE CANNOT BE TRACKED
INPUT DEVICE CAN BE TRACKED
INPUT DEVICE IS NOT HELD IN HAND
INPUT DEVICE IS HELD IN HAND
FIRST MODE
NO GUIDE DISPLAY
POSITION OF INPUT DEVICE IS DETECTED
POSITION OF INPUT DEVICE IS LOST
SECOND MODE
APPROXIMATE POSITION GUIDE
FIFTH MODE
GUIDE ERASURE
OUTSIDE FIELD OF VIEW OR OVER 1.3 M
WITHIN FIELD OF VIEW AND WITHIN 1.3 M
CONTACT WITH OPERATING MEMBER
NO CONTACT WITH OPERATING MEMBER
THIRD MODE
APPROXIMATE POSITION GUIDE
INSERTION POSITION GUIDE
INSERTION DIRECTION GUIDE
NON-STATIONARY STATE OF INPUT DEVICE IS CONTINUED FOR ONE SECOND OR MORE
STATIONARY STATE OF INPUT DEVICE IS CONTINUED FOR 10 SECONDS OR MORE
FOURTH MODE
APPROXIMATE POSITION GUIDE
INSERTION POSITION GUIDE

INFORMATION PROCESSING DEVICE, CONTROLLER DISPLAY METHOD, AND COMPUTER PROGRAM

CROSS-REFERENCE TO RELATED APPLICATIONS

This application is a national stage application, pursuant to 35 U.S.C. § 371, of International Patent Application No. PCT/JP2023/019468, filed May 25, 2023, which claims priority to Japanese Patent Application No. 2022-091709, filed Jun. 6, 2022, the entire contents of each are incorporated herein by reference.

TECHNICAL FIELD

The present invention relates to an information processing device, a controller display method, and a computer program.

BACKGROUND ART

An image display system has spread which enables a user wearing a head-mounted display to view a target space from a free viewpoint. For example, electronic content for realizing virtual reality (VR) by setting a virtual three-dimensional space as a display target and displaying an image corresponding to a sight line direction of the user on the head-mounted display is known (the electronic content will hereinafter be referred to also as "VR content"). The use of the head-mounted display can also enhance a sense of immersion in video and improve operability of an application such as a game.

In addition, a walkthrough system has also been developed which enables the user wearing the head-mounted display to virtually walk around in a space displayed as the VR content by moving physically. In addition, video see-through has also been realized in which three-dimensional content is displayed so as to be superimposed on the video of a surrounding real world captured by a camera included in the head-mounted display.

SUMMARY

Technical Problem

The user using the head-mounted display may put on the head-mounted display without holding a controller in a hand, and try to hold the controller in a hand after putting on the head-mounted display. In this case, the user can view the video of the surroundings captured by the camera of the head-mounted display, but may not know how to hold the controller until the user is accustomed to the shape of the controller.

It is an object of the present invention to provide a technology for assisting a user wearing a head-mounted display in correctly gripping a controller.

Solution to Problem

In order to solve the above problem, an information processing device according to an aspect of the present invention includes a captured image obtaining section configured to obtain a captured image resulting from capturing a front of a user wearing a head-mounted display, an estimating section configured to estimate a position of a controller including a gripping portion to be gripped by the user on the basis of the captured image in which the controller appears, and a display control section configured to display the captured image resulting from capturing the front of the user on the head-mounted display. The display control section further displays a first object indicating a part to be gripped by the user together with the captured image on the basis of an estimation result of the position of the controller.

Another aspect of the present invention is a controller display method. This method performed by a computer includes a step of obtaining a captured image resulting from capturing a front of a user wearing a head-mounted display, a step of estimating a position of a controller including a gripping portion to be gripped by the user on the basis of the captured image in which the controller appears, and a step of displaying the captured image resulting from capturing the front of the user on the head-mounted display. The displaying step further displays a first object indicating a part to be gripped by the user together with the captured image on the basis of an estimation result of the position of the controller.

It is to be noted that any combinations of the above constituent elements as well as modes obtained by converting expressions of the present invention between a system, a computer program, a recording medium having the computer program readably recorded thereon, a data structure, and the like are also effective as modes of the present invention.

BRIEF DESCRIPTION OF DRAWINGS

FIG. 4(*a*) is a diagram illustrating a shape of an input device for a left hand, and FIG. 4(*b*) is a diagram illustrating a shape of an input device for a right hand.

FIG. 10 is a diagram illustrating an internal configuration of an estimation processing section.

FIG. 11 is a diagram illustrating an example of transitions of guide display in a camera AR video.

DESCRIPTION OF EMBODIMENT

In an initial stage of an initial setting flow of an information processing system that displays VR content on a head-mounted display, an information processing device (game machine or the like) and a controller (referred to also as an "input device" in an embodiment) are paired with each other. The head-mounted display can also be said to be a VR headset. The head-mounted display will hereinafter be referred to also as an "HMD." At a time point of the pairing, the controller is set in a power-on state, or in other words, set in a state of being supplied with power from a power supply such as a battery. After the pairing, a user mounts the HMD on a head portion thereof without holding the controller in a hand, and performs various kinds of adjustments. Then, in a final stage of the initial setting flow, the user holds the controller in a hand, and performs an operation related to the editing of a play area in which the user wearing the HMD can move.

When the user is to hold the controller in a hand to edit the play area, the user can view the video of a surrounding real world captured by a camera of the HMD. However, it is not easy for an unaccustomed user to find the controller on the basis of the video captured by the camera of the HMD, and determine the attitude of the controller correctly and grip the controller correctly.

Accordingly, the information processing system according to the embodiment adds information assisting in correctly gripping the controller to the video captured by the camera of the HMD, and presents the resulting video to the user. Specifically, as information assisting in correctly gripping the controller, an object indicating a part to be gripped is added in the vicinity of a gripping portion of the controller appearing in a captured image. In the embodiment, the controller includes a curved portion for the user to insert a hand in addition to the gripping portion, and as the information assisting in correctly gripping the controller, an object indicating the part through which to insert a hand is added in the vicinity of the curved portion of the controller appearing in the captured image. The user wearing the HMD is thereby assisted in correctly gripping the controller.

Figure 1:
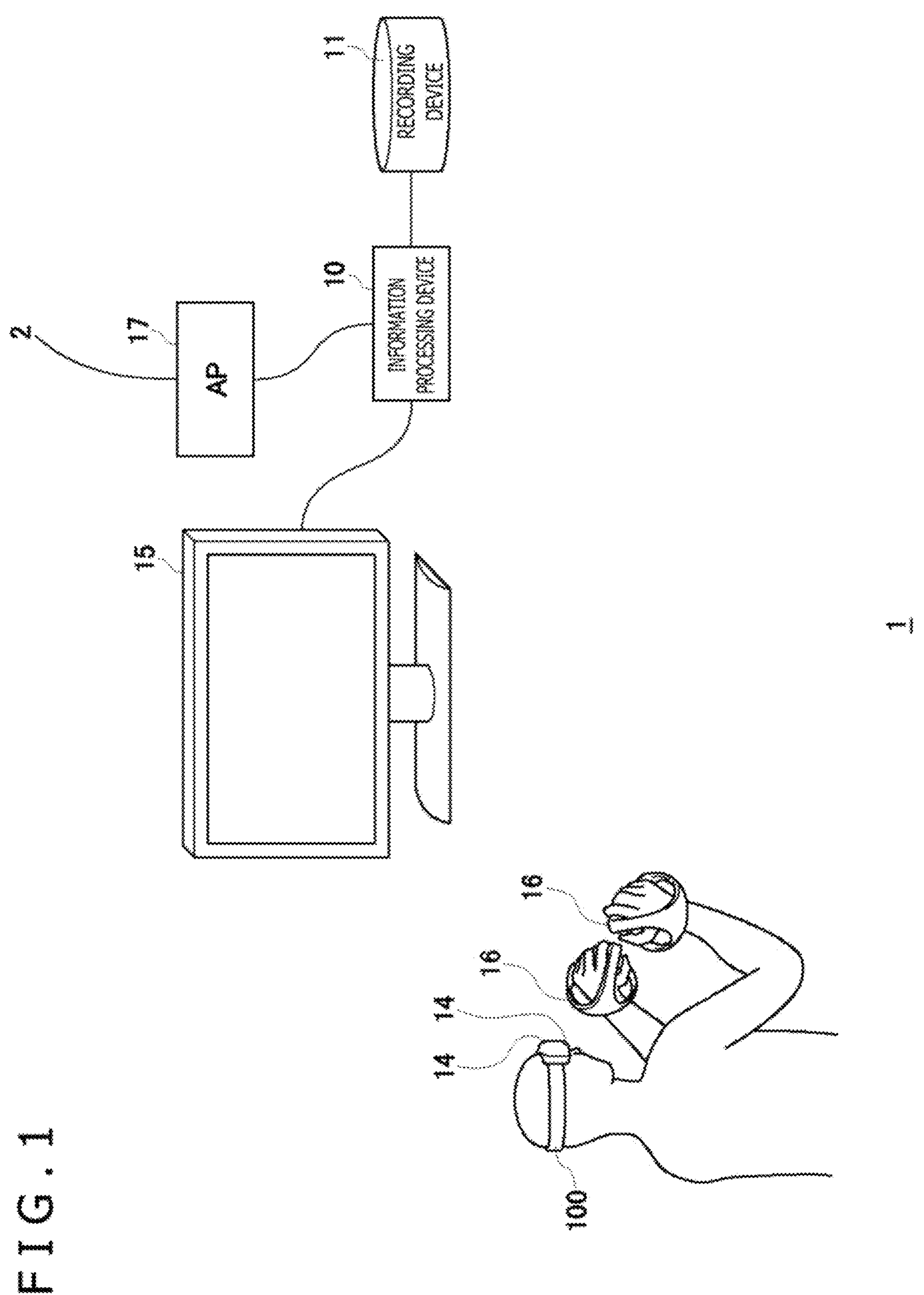
FIG. 1 is a diagram illustrating an example of a configuration of an information processing system in an embodiment.

FIG. 1 illustrates an example of a configuration of an information processing system 1 in an embodiment. The information processing system 1 includes an information processing device 10, a recording device 11, an HMD 100, an input device 16 held by the user and operated by fingers thereof, and an output device 15 that outputs an image and sound. The output device 15 may be a television set. The information processing device 10 is connected to an external network 2 such as the Internet via an access point (AP) 17. The AP 17 has functions of a wireless access point and a router. The information processing device 10 may be connected to the AP 17 by a cable, or may be connected to the AP 17 by a known wireless communication protocol.

The recording device 11 records system software and applications such as game software. The information processing device 10 may download various applications such as the game software from a content server to the recording device 11 via the network 2. The information processing device 10 executes the various applications, and supplies the HMD 100 with image data and audio data on an application intended for output (which data can also be said to be the data on VR content). The information processing device 10 and the HMD 100 may be connected to each other by a known wireless communication protocol, and may be connected to each other by a cable.

The HMD 100 is a display device that displays an image on a display panel that is located in front of eyes of the user when the user wears the HMD 100 on the head portion thereof. The HMD 100 individually and separately displays an image for the left eye on a display panel for the left eye and an image for the right eye on a display panel for the right eye. These images constitute parallax images as viewed from a left and a right viewpoint, and realize a stereoscopic view. The user views the display panel through optical lenses. The information processing device 10 therefore supplies the HMD 100 with parallax image data resulting from correction of optical distortion by the lenses.

The output device 15 is not necessary for the user wearing the HMD 100. However, the preparation of the output device 15 enables another user to view the display image of the output device 15. The information processing device 10 may display the same image as the image viewed by the user wearing the HMD 100 on the output device 15. However, the information processing device 10 may display another image on the output device 15. For example, in a case where the user wearing the HMD 100 and another user plays a game together, a game image obtained from a character viewpoint of the other user may be displayed from the output device 15.

The information processing device 10 and the input device 16 may be connected to each other by a known wireless communication protocol, and may be connected to each other by a cable. The input device 16 includes a plurality of operating members such as operating buttons. The user operates the operating members by fingers while gripping the input device 16. The input device 16 is used as a game controller when the information processing device 10 executes a game. For example, user operations related to the progress of the game are input to the operating members, and the input device 16 transmits operation information thereof to the information processing device 10 to make the user operations reflected in the game. As a modification, the input device 16 may be a controller that communicates with the HMD 100 and controls the operation of the HMD 100.

The input device 16 is provided with an inertial measurement device (IMU) including a triaxial acceleration sensor and a triaxial angular velocity sensor. The input device 16 transmits sensor data measured by the IMU to the information processing device 10 in a predetermined cycle (for example, 800 Hz).

The game in the embodiment deals with not only the operation information on the operating members of the input device 16 but also the position, the speed, the attitude, and the like of the input device 16 as operation information, and reflects the operation information in the motion of a player character in a virtual three-dimensional space. For example, the operation information on the operating members may be used as information for moving the player character, and the operation information such as the position, the speed, and the attitude of the input device 16 may be used as information for moving arms of the player character. When the motion of the input device 16 is reflected in the motion of the player character having a weapon in a battle scene in the game, intuitive operations of the user are realized, and a sense of immersion in the game is enhanced.

In order to track the position and the attitude of the input device 16, the input device 16 is provided with a plurality of markers (light emitting units) that can be captured by imaging devices 14. The information processing device 10 has a function of analyzing an image obtained by capturing the input device 16 and estimating the position and the attitude of the input device 16 in a real space (which function will hereinafter be referred to also as a "first estimating function").

The HMD 100 is mounted with a plurality of the imaging devices 14. The plurality of imaging devices 14 are attached in different attitudes to different positions of a front surface of the HMD 100 such that an entire capturing range obtained by adding together capturing ranges of the respective imaging devices 14 includes all of a field of view of the user. The imaging devices 14 each include an image sensor capable of obtaining images of the plurality of markers of the input device 16. In a case where the markers emit visible light, for example, the imaging devices 14 each include a visible light sensor used in an ordinary digital video camera, such as a CCD (Charge Coupled Device) sensor or a CMOS (Complementary Metal Oxide Semiconductor) sensor. In a case where the markers emit invisible light, the imaging devices 14 each include an invisible light sensor.

The plurality of imaging devices 14 capture the front of the user in a predetermined period (for example, 120 frames/sec) in synchronized timing, and transmit the data on an image obtained by capturing the real space (which image will hereinafter be referred to also as a "captured image") to the information processing device 10. The captured image in the embodiment is an image obtained by capturing the real space in a direction of the front of the user wearing the HMD 100 (in a direction in which the face of the user is oriented).

The information processing device 10 performs the first estimating function and thereby identifies the positions of a plurality of marker images of the input device 16 included in the captured image. Incidentally, while one input device 16 may be captured by the plurality of imaging devices 14 in same timing, the information processing device 10 may synthesize the plurality of captured images and identify the positions of the marker images because attachment positions and attachment attitudes of the imaging devices 14 are known.

The three-dimensional shape of the input device 16 and the position coordinates of the plurality of markers arranged on the surface of the input device 16 are known. The information processing device 10 estimates the position and the attitude in the real space of the input device 16 on the basis of the position coordinates of the plurality of marker images in the captured image. The position of the input device 16 may be estimated as a coordinate value in world coordinates in a three-dimensional space having a reference position as an origin. The reference position may be position coordinates (latitude, longitude, and altitude (height above the sea level)) set before a start of the game. In addition, the attitude of the input device 16 may be expressed by an inclination or an angle on each of three axes with respect to a predetermined reference attitude.

The information processing device 10 in the embodiment has a function of analyzing the sensor data transmitted from the input device 16 and estimating the position and the attitude of the input device 16 in the real space (which function will hereinafter be referred to also as a "second estimating function"). The information processing device 10 derives the position and the attitude of the input device 16 by using an estimation result of the first estimating function and an estimation result of the second estimating function. The information processing device 10 in the embodiment integrates the estimation result of the first estimating function and the estimation result of the second estimating function by utilizing a state estimating technology using a Kalman filter, and thereby estimates the state of the input device 16 at a present time with high accuracy.

Figure 2:
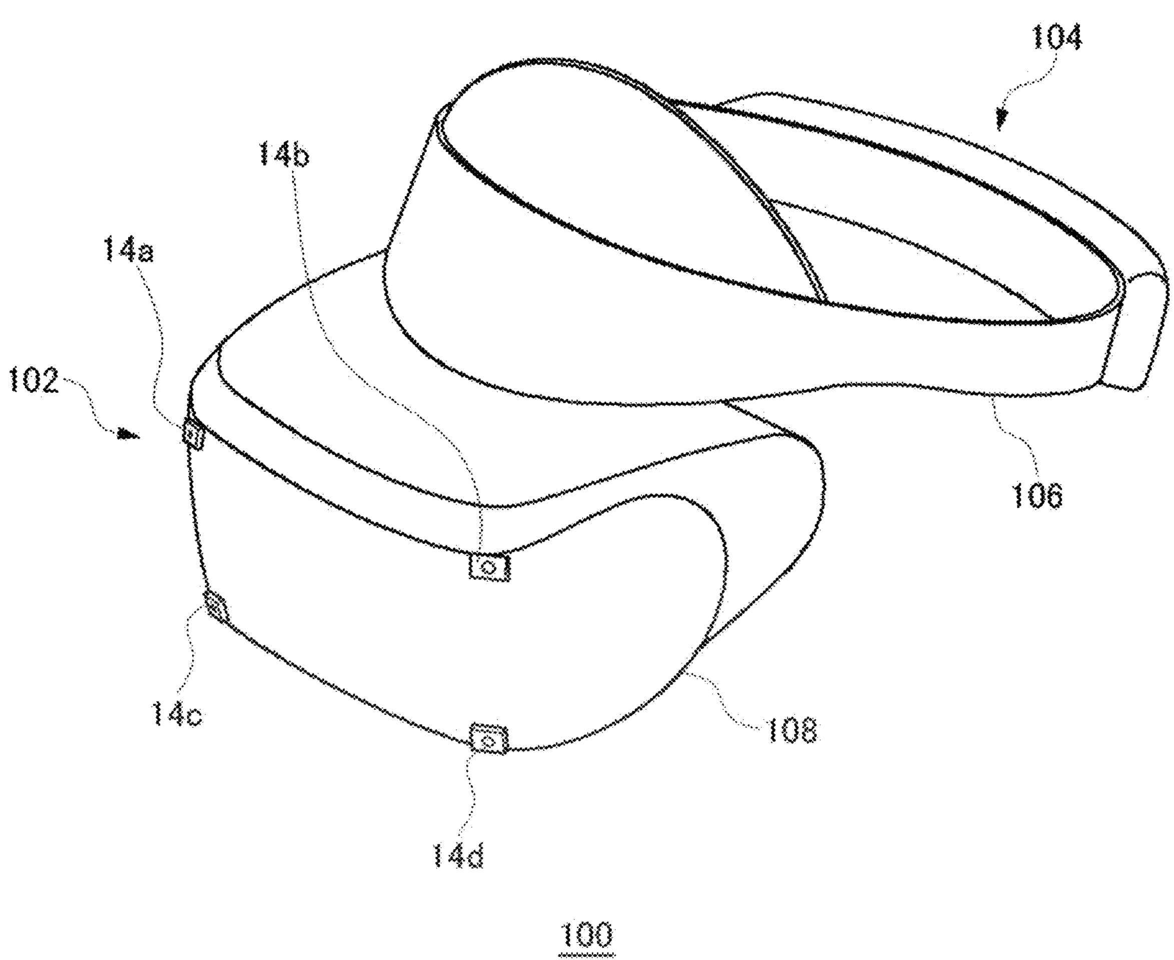
FIG. 2 is a diagram illustrating an example of an external shape of an HMD.

FIG. 2 illustrates an example of an external shape of the HMD 100. The HMD 100 includes an output mechanism unit 102 and a mounting mechanism unit 104. The mounting mechanism unit 104 includes a mounting band 106 that encircles the head portion and fixes the HMD 100 to the head portion when the user puts on the mounting band 106. The mounting band 106 is of a material or a structure that allows a length adjustment thereof according to the circumference of the head of the user.

The output mechanism unit 102 includes a casing 108 having such a shape as to cover the left and right eyes in a state in which the user wears the HMD 100, and internally includes the display panel that squarely faces the eyes at a time of the wearing. The display panel may be a liquid crystal panel, an organic EL panel, or the like. Further included in the casing 108 is a pair of left and right optical lenses that are located between the display panel and the eyes of the user and that expand the viewing angle of the user. The HMD 100 may further include speakers or earphones at positions corresponding to ears of the user, or may be configured to be connected with external headphones.

An external surface on the front side of the casing 108 is provided with imaging devices **14*a*, 14*b*, 14*c*, and 14*d* as the plurality of imaging devices 14. With a frontward direction of the face of the user as a reference, the imaging device 14*a* is attached to an upper right corner of the external surface on the front side such that a camera optical axis thereof is directed rightward and obliquely upward, the imaging device 14*b* is attached to an upper left corner of the external surface on the front side such that a camera optical axis thereof is directed leftward and obliquely upward, the imaging device 14*c* is attached to a lower right corner of the external surface on the front side such that a camera optical axis thereof is directed rightward and obliquely downward, and the imaging device 14*d* is attached to a lower left corner of the external surface on the front side such that a camera optical axis thereof is directed leftward and obliquely downward. Because the plurality of imaging devices 14 are thus installed, an entire capturing range obtained by adding together the respective capturing ranges of the plurality of imaging devices 14** includes all of the field of view of the user. The field of view of the user may be a field of view of the user in a three-dimensional virtual space.

The HMD 100 transmits sensor data detected by the IMU and image data captured by the imaging device 14 to the information processing device 10, and receives game image data and game sound data generated in the information processing device 10.

Figure 3:
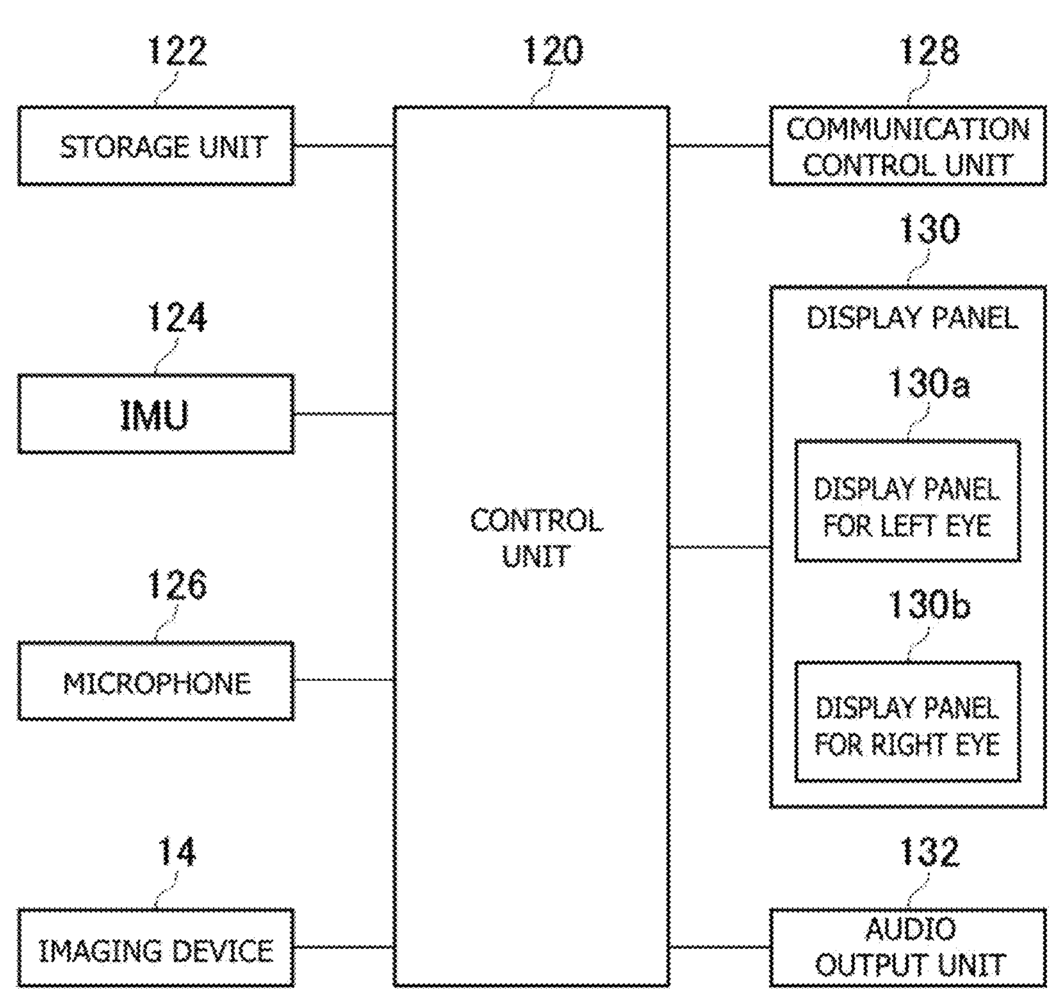
FIG. 3 is a diagram illustrating functional blocks of the HMD.

FIG. 3 illustrates a functional block of the HMD 100. A control unit 120 is a main processor that processes various kinds of data such as image data, audio data, and sensor data as well as instructions, and performs output. The control unit 120 may include a CPU (Central Processing Unit) and a GPU (Graphics Processing Unit). A storage unit 122 temporarily stores the data and the instructions processed by the control unit 120 and the like. An IMU 124 obtains the sensor data related to motion of the HMD 100. The IMU 124 may include at least a triaxial acceleration sensor and a triaxial angular velocity sensor. The IMU 124 detects the values (sensor data) of respective axial components in a predetermined cycle (for example, 800 Hz).

A communication control unit 128 transmits data output from the control unit 120 to the external information processing device 10 by wired or wireless communication via a network adapter or an antenna. In addition, the communication control unit 128 receives data from the information processing device 10, and outputs the data to the control unit 120.

When the control unit 120 receives the game image data and the game sound data from the information processing device 10, the control unit 120 supplies the game image data to a display panel 130 to make a display thereof and supplies the game sound data to an audio output unit 132 to perform an audio output thereof. The display panel 130 includes a display panel 130*a* for the left eye and a display panel 130*b* for the right eye. A pair of parallax images are displayed on the respective display panels. In addition, the control unit 120 causes sensor data from the IMU 124, audio data from a microphone 126, and captured image data from the imaging devices 14 to be transmitted from the communication control unit 128 to the information processing device 10.

FIG. 4(*a*) illustrates the shape of an input device 16*a* for a left hand. The input device 16*a* for the left hand includes a case body 20, a plurality of operating members 22*a*, 22*b*, 22*c*, and 22*d* (hereinafter referred to as "operating members 22" in a case where the plurality of operating members 22*a*, 22*b*, 22*c*, and 22*d* are not particularly distinguished from each other) operated by the user, and a plurality of markers 30 that emit light to the outside of the case body 20. The markers 30 may have an emitting unit having a circular cross section. The operating members 22 may include an analog stick operated by tilting, a depression type button, and the like. The case body 20 includes a gripping portion 21 and a curved portion 23 that couples a case body head portion and a case body bottom portion to each other. The user puts the left hand through the curved portion 23, and grips the gripping portion 21. The user operates the operating members 22*a*, 22*b*, 22*c*, and 22*d* by using a thumb of the left hand in a state in which the user grips the gripping portion 21.

FIG. 4(*b*) illustrates the shape of an input device 16*b* for a right hand. The input device 16*b* for the right hand includes a case body 20, a plurality of operating members 22*e*, 22*f*, 22*g*, and 22*h* (hereinafter referred to as "operating members 22" in a case where the plurality of operating members 22*e*, 22*f*, 22*g*, and 22*h* are not particularly distinguished from each other) operated by the user, and a plurality of markers 30 that emit light to the outside of the case body 20. The operating members 22 may include an analog stick operated by tilting, a depression type button, and the like. The case body 20 includes a gripping portion 21 and a curved portion 23 that couples a case body head portion and a case body bottom portion to each other. The user puts the right hand through the curved portion 23, and grips the gripping portion 21. The user operates the operating members 22*e*, 22*f*, 22*g*, and 22*h* by using a thumb of the right hand in a state in which the user grips the gripping portion 21.

Figure 5:
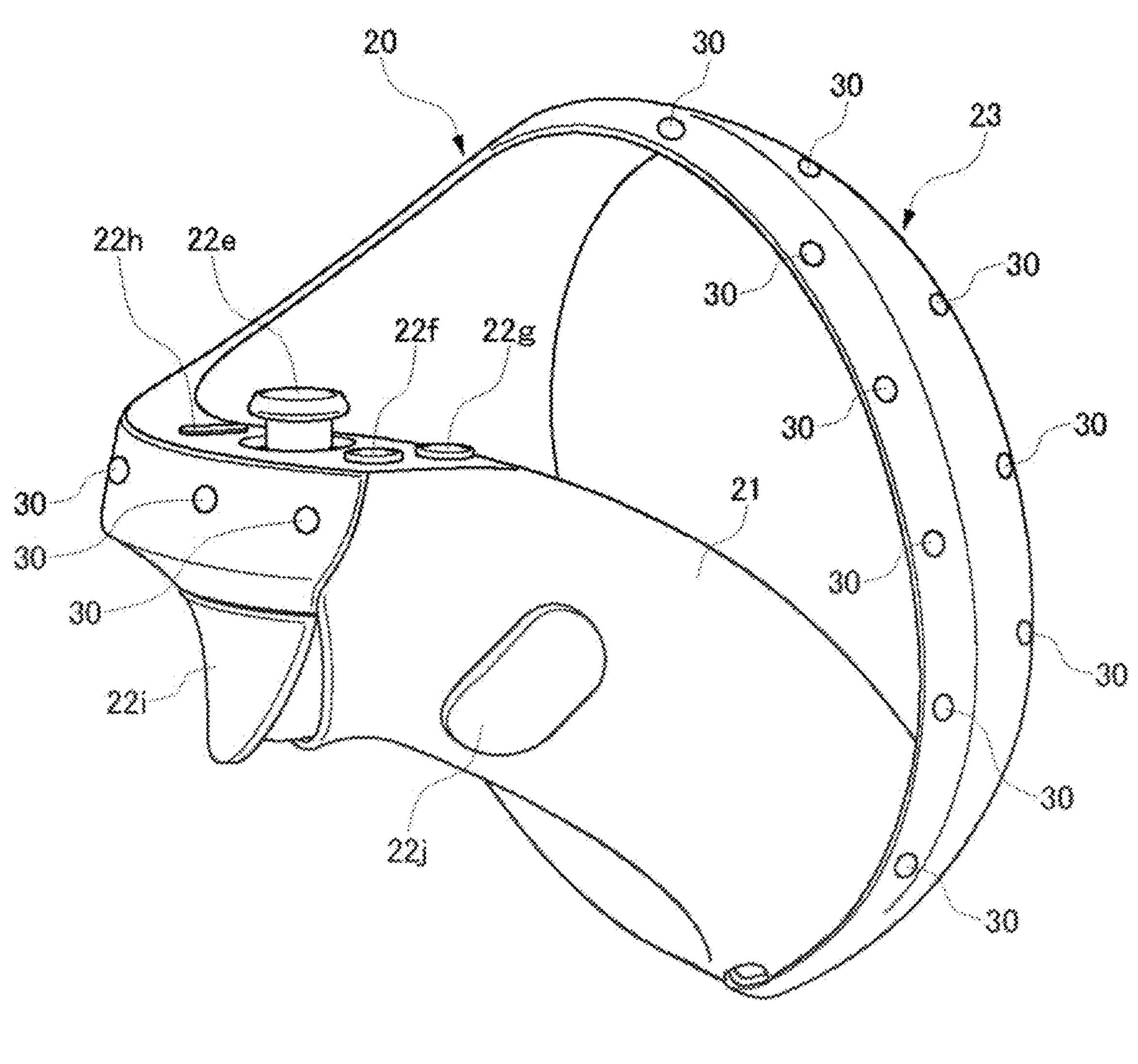
FIG. 5 is a diagram illustrating the shape of the input device for the right hand.

FIG. 5 illustrates the shape of the input device 16*b* for the right hand. The input device 16*b* includes operating members 22*i* and 22*j* in addition to the operating members 22*e*, 22*f*, 22*g*, and 22*h* illustrated in FIG. 4(*b*). In a state of gripping the gripping portion 21, the user operates the operating member 22*i* by using an index finger of the right hand, and operates the operating member 22*j* by using a middle finger thereof. In the following, in a case where the input device 16*a* and the input device 16*b* are not particularly distinguished from each other, the input device 16*a* and the input device 16*b* will be referred to as an "input device 16." The input device 16 in the embodiment is a controller including the gripping portion 21 to be gripped by the user after the user inserts a hand through the curved portion 23.

Operating members 22 provided to the input device 16 may have a touch sensing function that recognizes a finger on the basis of a mere touch thereof without pressing. As for the input device 16*b* for the right hand, the operating members 22*f*, 22*g*, and 22*j* may have a capacitive type touch sensor. Incidentally, while a touch sensor may be included in another operating member 22, a touch sensor is preferably included in an operating member 22 such that the touch sensor does not come into contact with a mounting surface such as a table when the input device 16 is placed on the mounting surface.

The markers 30 are a light emitting unit that emits light to the outside of the case body 20. The markers 30 include, in the surface of the case body 20, a resin portion that diffuses and emits light from a light source such as an LED (Light Emitting Diode) element to the outside. The markers 30 are captured by the imaging devices 14, and are used for tracking processing of the input device 16.

The information processing device 10 uses the captured image captured by the imaging devices 14 for the tracking processing of the input device 16 and SLAM (Simultaneous Localization and Mapping) processing of the HMD 100. In the embodiment, of images captured by the imaging devices 14 at 120 frames/sec, gray scale images captured at 60 frames/sec may be used for the tracking processing of the input device 16, and other full color images captured at 60 frames/sec may be used for processing of simultaneously performing self-position estimation and environmental map generation of the HMD 100.

Figure 6:
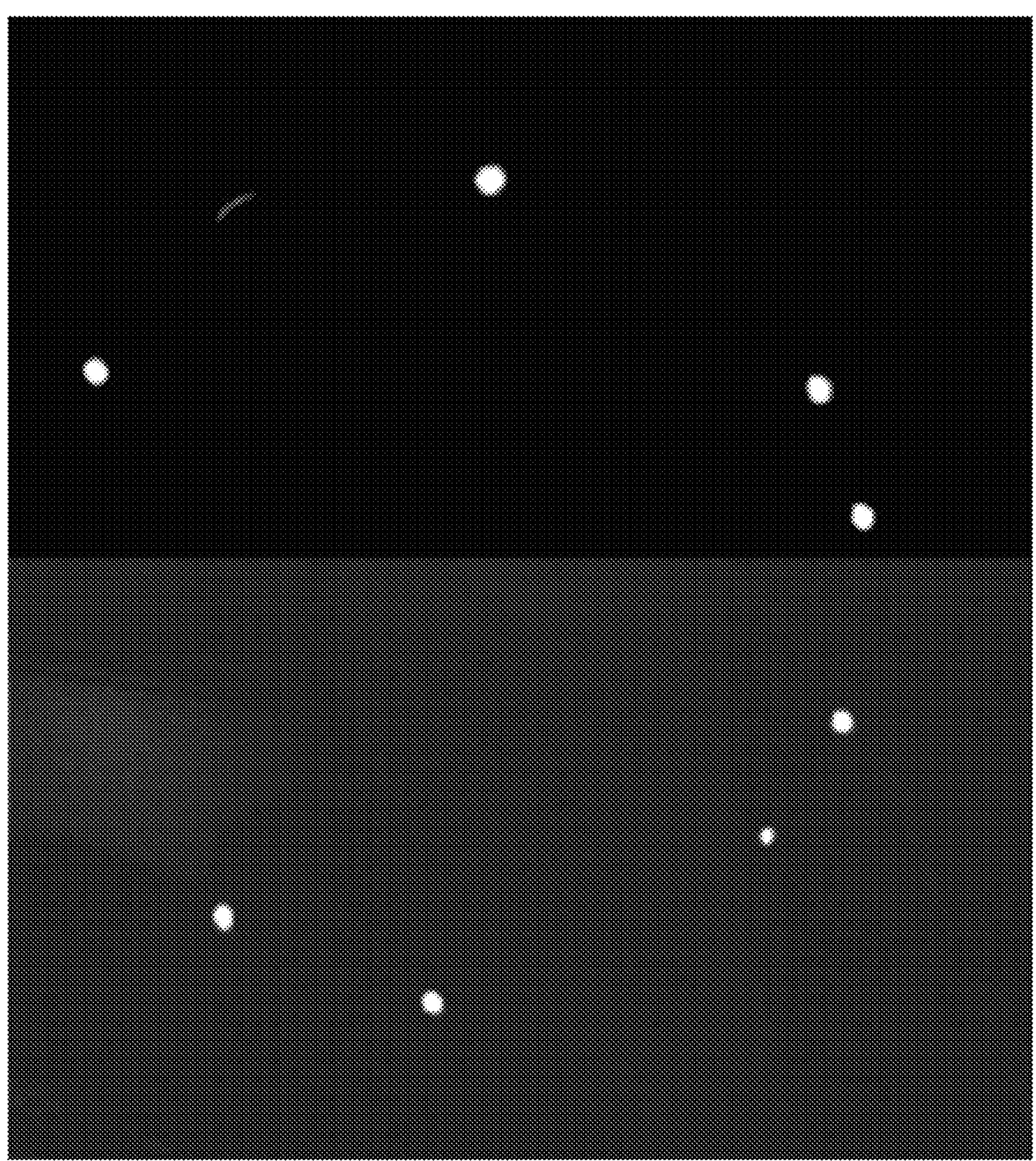
FIG. 6 is a diagram illustrating an example of a part of an image obtained by capturing an input device.

FIG. 6 illustrates an example of a part of an image obtained by capturing the input device 16. This image is an image obtained by capturing the input device 16*b* held by the right hand, and includes images of the plurality of markers 30 that emit light. The communication control unit 128 in the HMD 100 transmits the image data captured by the imaging devices 14 to the information processing device 10 in real time.

Figure 7:
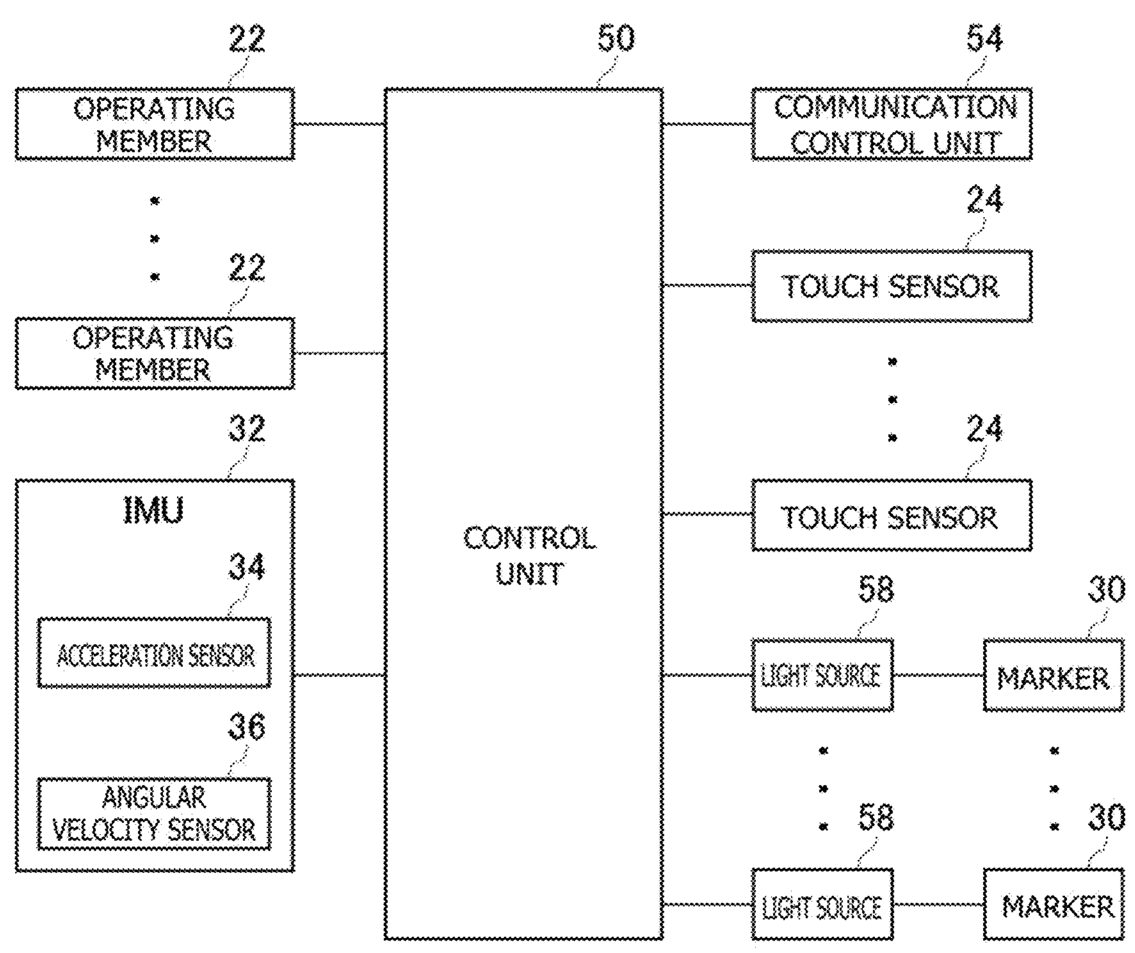
FIG. 7 is a block diagram illustrating functional blocks of the input device.

FIG. 7 is a block diagram illustrating functional blocks of the input device 16. A control unit 50 receives operation information input to the operating members 22. In addition, the control unit 50 receives sensor data detected by an IMU 32 and sensor data detected by touch sensors 24. As described above, the touch sensors 24 are attached to at least some of the plurality of operating members 22, and sense states in which fingers of the user are in contact with the operating members 22.

The IMU 32 obtains the sensor data related to motion of the input device 16. The IMU 32 includes at least an acceleration sensor 34 that detects triaxial acceleration data and an angular velocity sensor 36 that detects triaxial angular velocity data. The acceleration sensor 34 and the angular velocity sensor 36 detect the values (sensor data) of respective axial components in a predetermined cycle (for example, 800 Hz). The control unit 50 supplies the received operation information and the received sensor data to a communication control unit 54. The communication control unit 54 transmits the operation information and the sensor data to the information processing device 10 by wired or wireless communication via a network adapter or an antenna.

The input device 16 includes a plurality of light sources 58 for lighting the plurality of markers 30. The light sources 58 may be an LED element that emits light in a predetermined color. When the communication control unit 54 obtains a light emission instruction from the information processing device 10, the control unit 50 makes the light sources 58 emit light and thereby lights the markers 30 on the basis of the light emission instruction. Incidentally, while one light source 58 is provided for one marker 30 in the example illustrated in FIG. 7, one light source 58 may light a plurality of markers 30.

Figure 8:
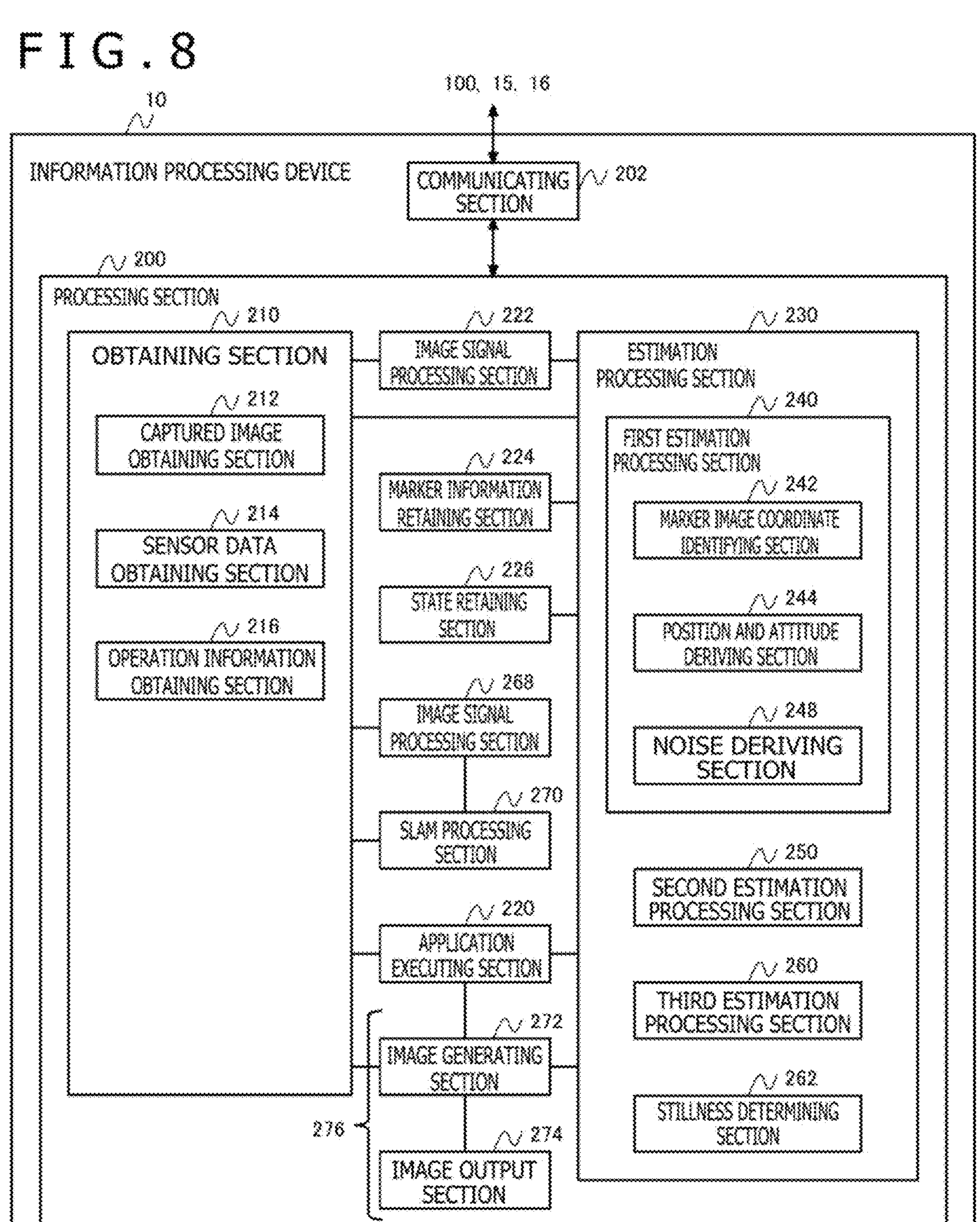
FIG. 8 is a block diagram illustrating functional blocks of an information processing device.

FIG. 8 is a block diagram illustrating functional blocks of the information processing device 10. The information processing device 10 includes a processing section 200 and a communicating section 202. The processing section 200 includes an obtaining section 210, an application executing section 220, an image signal processing section 222, a marker information retaining section 224, a state retaining section 226, an estimation processing section 230, an image signal processing section 268, a SLAM processing section 270, an image generating section 272, and an image output section 274. The obtaining section 210 includes a captured image obtaining section 212, a sensor data obtaining section 214, and an operation information obtaining section 216. The estimation processing section 230 includes a first estimation processing section 240, a second estimation processing section 250, a third estimation processing section 260, and a stillness determining section 262.

The communicating section 202 communicates with an external device according to a predetermined communication protocol. The external device includes the HMD 100, the output device 15, the input device 16, a server not illustrated, and another information processing device. For example, the communicating section 202 receives the operation information on the operating members 22 and the sensor data transmitted from the input device 16, and supplies the operation information and the sensor data to the obtaining section 210. In addition, the communicating section 202 receives the captured image data and the sensor data transmitted from the HMD 100, and supplies the captured image data and the sensor data to the obtaining section 210.

The information processing device 10 includes a computer. The computer implements the various functions illustrated in FIG. 8 by executing a program. The computer includes, as hardware, a memory into which to load the program, one or more processors (a CPU, a GPU, and the like) for executing the loaded program, an auxiliary storage device, another LSI, and the like. The processor may include a plurality of electronic circuits including a semiconductor integrated circuit or an LSI. The plurality of electronic circuits may be mounted on one chip, or may be mounted on a plurality of chips. The functional blocks illustrated in FIG. 8 are implemented by cooperation between hardware and software. Hence, it is to be understood by those skilled in the art that these functional blocks can be implemented in various forms by only hardware, only software, or combinations of hardware and software.

(SLAM Function)

The captured image obtaining section 212 obtains the full color images for the SLAM processing of the HMD 100, and supplies the full color images to the image signal processing section 268. The image signal processing section 268 subjects the image data to image signal processing such as noise reduction and optical correction (shading correction), and supplies the image data resulting from the image signal processing to the SLAM processing section 270.

The sensor data obtaining section 214 obtains the sensor data transmitted from the HMD 100, and supplies the sensor data to the SLAM processing section 270. The SLAM processing section 270 simultaneously performs self-position estimation and environmental map generation of the HMD 100 on the basis of the image data supplied from the captured image obtaining section 212 and the sensor data supplied from the sensor data obtaining section 214.

(First Estimating Function Using Captured Images)

The captured image obtaining section 212 obtains the gray scale images for the tracking processing of the input device 16, and supplies the gray scale images to the image signal processing section 222. The image signal processing section 222 subjects the image data to image signal processing such as noise reduction and optical correction (shading correction), and supplies the image data resulting from the image signal processing to the first estimation processing section 240.

The first estimation processing section 240 includes a marker image coordinate identifying section 242, a position and attitude deriving section 244, and a noise deriving section 248. The first estimation processing section 240 implements the first estimating function of estimating the position and the attitude of the input device 16 on the basis of the image obtained by capturing the input device 16. The first estimation processing section 240 extracts marker images obtained by capturing the plurality of markers 30 of the input device 16 from the captured image, and estimates the position and the attitude of the input device 16 from an arrangement of a plurality of the extracted marker images. The first estimation processing section 240 outputs the estimated position and attitude of the input device 16 to the third estimation processing section 260 together with the variance of noise (error) thereof.

(Second Estimating Function Using Sensor Data)

The sensor data obtaining section 214 obtains the sensor data transmitted from the input device 16, and supplies the sensor data to the second estimation processing section 250. The second estimation processing section 250 implements the second estimating function of estimating the position and the attitude of the input device 16 on the basis of the sensor data indicating the acceleration and angular velocity of the input device 16. In the embodiment, the second estimating function is a function of performing a state predicting step in a Kalman filter. The second estimation processing section 250 estimates a state vector at this time by adding a state vector change amount obtained by integral operation on the supplied sensor data to a state vector (position, speed, and attitude) at a previous time. The second estimation processing section 250 outputs the estimated state vector to the third estimation processing section 260 together with the variance of noise thereof. Incidentally, the change amount obtained by the integral operation accumulates noise over time. Thus, the state vector (position, speed, and attitude) estimated by the second estimation processing section 250 tends to deviate from an actual state vector (position, speed, and attitude).

(Estimation Result Integrating Function)

The third estimation processing section 260 derives the position and the attitude of the input device 16 with high accuracy from the position and attitude of the input device 16 estimated by the first estimation processing section 240 and the state vector (position, speed, and attitude) of the input device 16 estimated by the second estimation processing section 250. The third estimation processing section 260 may perform a filtering step (correcting step) of a UKF (unscented Kalman Filter). The third estimation processing section 260 obtains the state vector estimated by the second estimation processing section 250 as a "prior estimated value," obtains the position and the attitude estimated by the first estimation processing section 240 as an "observed value," calculates a Kalman gain, and obtains an "posterior estimated value" resulting from correcting the "prior estimated value" by using the Kalman gain. The "posterior estimated value" represents the position and attitude of the input device 16 with high accuracy. The "posterior estimated value" is provided to the application executing section 220, and is recorded in the state retaining section 226 to be used for the estimation of the state vector at a next time in the second estimation processing section 250.

A method of increasing accuracy by integrating results of analysis using a plurality of sensors such as the imaging devices 14 and the IMU 32 is known as sensor fusion. In the sensor fusion, times at which data is obtained by the respective sensors need to be expressed on a common time axis. In the information processing system 1, the imaging cycle of the imaging devices 14 and the sampling cycle of the IMU 32 are different from each other and are asynchronous with each other. Thus, by accurately managing the capturing times of images and the detection times of acceleration and angular velocity, the third estimation processing section 260 can estimate the position and the attitude of the input device 16 with high accuracy.

Figure 9:
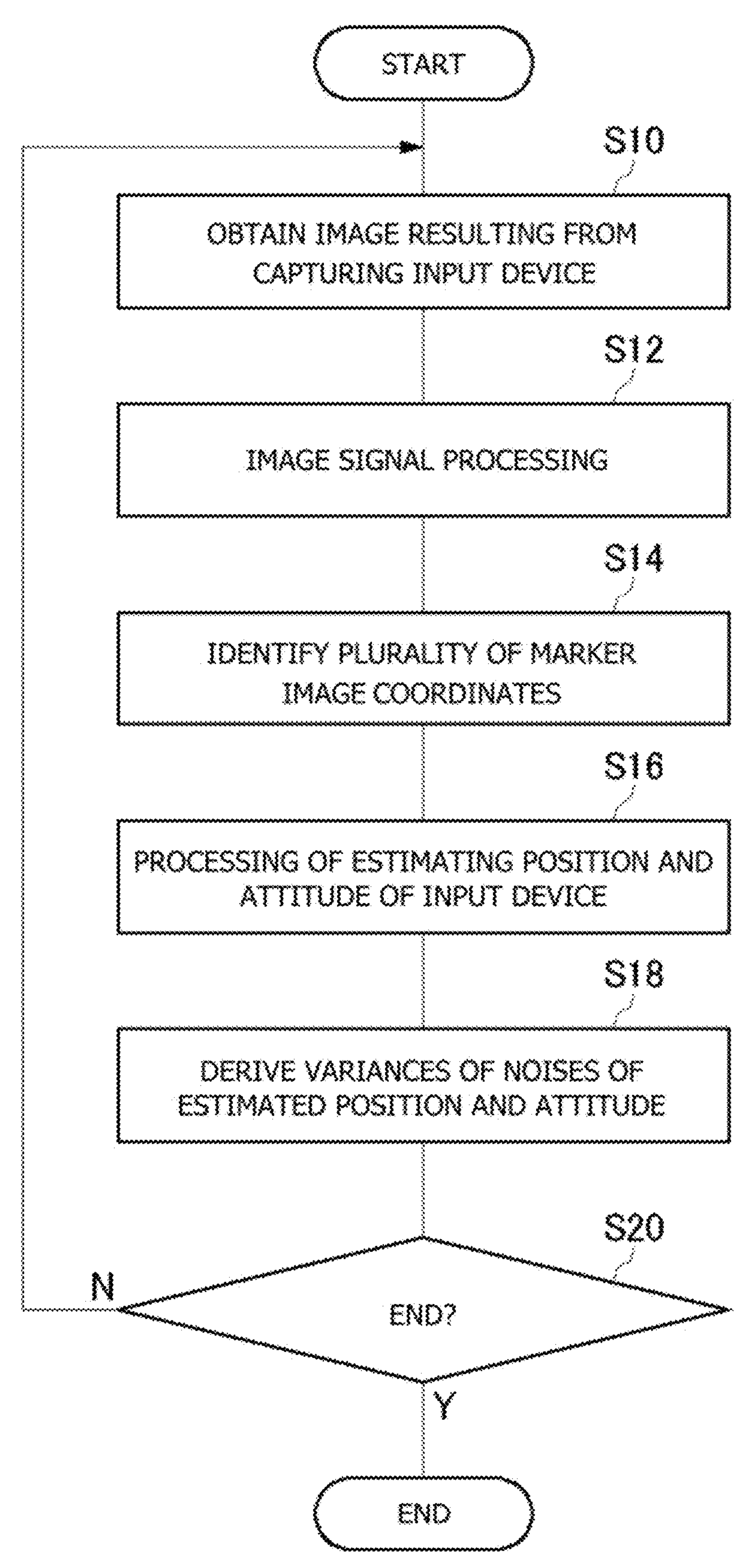
FIG. 9 is a flowchart illustrating position and attitude estimation processing.

FIG. 9 is a flowchart illustrating position and attitude estimation processing by the first estimation processing section 240. The captured image obtaining section 212 obtains the image data resulting from capturing the input device 16 (S10) and supplies the image data to the image signal processing section 222. The image signal processing section 222 subjects the image data to image signal processing such as noise reduction and optical correction (S12) and supplies the image data resulting from the image signal processing to the marker image coordinate identifying section 242.

The marker image coordinate identifying section 242 identifies representative coordinates of the plurality of marker images included in the captured image (S14). In a case where the luminance of each pixel of a gray scale image is represented by 8 bits, and assumes a luminance value of 0 to 255, the marker images are captured as images having high luminance, as illustrated in FIG. 6. The marker image coordinate identifying section 242 may identify a region of consecutive pixels having luminance values equal to or higher than a predetermined value (for example, a luminance value of 128) from the captured image, calculate gravity center coordinates of the consecutive pixel region, and thereby identify the representative coordinates of a marker image.

Incidentally, the captured image includes not only the marker images but also an image of a lighting device such as an electric light. Accordingly, the marker image coordinate identifying section 242 investigates whether the consecutive pixel region having the luminance values equal to or higher than the predetermined value corresponds to a marker image by checking the consecutive pixel region against a few predetermined criteria. For example, in a case where the consecutive pixel region is too large, or in a case where the consecutive pixel region has an elongated shape, it is certain that the consecutive pixel region does not correspond to a marker image, and therefore, the marker image coordinate identifying section 242 may determine that such a consecutive pixel region is not a marker image. The marker image coordinate identifying section 242 calculates the gravity center coordinates of a consecutive pixel region satisfying the predetermined criteria, identifies the gravity center coordinates as the representative coordinates (marker image coordinates) of a marker image, and stores the identified representative coordinates in a memory (not illustrated).

The marker information retaining section 224 retains three-dimensional coordinates of each marker in a three-dimensional model of the input device 16 in the reference position and the reference attitude. A method of solving a PNP (Perspective n-Point) problem is known as a method for estimating the position and the attitude of an imaging device that captures an object whose three-dimensional shape and size are known from a captured image of the object.

In the embodiment, the position and attitude deriving section 244 reads the coordinates of N (N is an integer of 3 or more) marker images from a memory (not illustrated), and estimates the position and the attitude of the input device 16 from the read coordinates of the N marker images and the three-dimensional coordinates of N markers in the three-dimensional model of the input device 16. The position and attitude deriving section 244 estimates the position and the attitude of the imaging device 14 by using the following (Equation 1), and derives the position and attitude in the three-dimensional space of the input device 16 on the basis of a result of the estimation.

[Math. 1]

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(Equation 1)}$$

Here, (u, v) is marker image coordinates in the captured image, and (X, Y, Z) is position coordinates in the three-dimensional space of the markers 30 when the three-dimensional model of the input device 16 is in the reference position and the reference attitude. Incidentally, the three-dimensional model is a model that has perfectly the same shape and size as the input device 16 and has markers arranged at the same positions. The marker information retaining section 224 retains the three-dimensional coordinates of each marker in the three-dimensional model in the reference position and the reference attitude. The position and attitude deriving section 244 obtains (X, Y, Z) by reading the three-dimensional coordinates of each marker from the marker information retaining section 224.

($f_x$, $f_y$) is the focal length of the imaging device 14, and ($c_x$, $c_y$) is an image principal point. Both are internal parameters of the imaging device 14. A matrix having $r_{11}$ to $r_{33}$ and $t_1$ to $t_3$ as elements is a rotation and translation matrix. In (Equation 1), (u, v), ($f_x$, $f_y$), ($c_x$, $c_y$), and (X, Y, Z) are known. The position and attitude deriving section 244 solves the equation for the N markers 30, and thereby obtains a rotation and translation matrix common to these markers. In the embodiment, the processing of estimating the position and the attitude of the input device 16 is performed by solving the P3P problem.

Specifically, the position and attitude deriving section 244 extracts the coordinates of freely selected three marker images from among the coordinates of the plurality of marker images identified by the marker image coordinate identifying section 242. The position and attitude deriving section 244 reads the three-dimensional coordinates of the markers in the three-dimensional model from the marker information retaining section 224, and solves the P3P problem by using (Equation 1). When the position and attitude deriving section 244 identifies a rotation and translation matrix common to the coordinates of the three extracted marker images, the position and attitude deriving section 244 calculates a reprojection error by using the marker image coordinates of the input device 16 other than the coordinates of the three extracted marker images.

The position and attitude deriving section 244 extracts a predetermined number of combinations of the coordinates of three marker images. The position and attitude deriving section 244 identifies a rotation and translation matrix for each of the combinations of the coordinates of the three extracted marker images, and calculates a reprojection error for each. Then, the position and attitude deriving section 244 identifies a rotation and translation matrix providing a minimum reprojection error from among a predetermined number of reprojection errors, and derives the position and the attitude of the input device 16 (S16).

The noise deriving section 248 derives the variance of noise (error) of each of the estimated position and attitude (S18). The variance value of the noise corresponds to a degree of reliability of the estimated position and attitude. When the degree of reliability is high, the variance value is small. When the degree of reliability is low, the variance value is large. The noise deriving section 248 may derive the variance of the noise on the basis of distances between the imaging devices 14 and the input device 16 and the positions of the marker images in an angle of view. For example, in a case where the imaging devices 14 are distant from the input device 16 or extremely close to the input device 16, or in a case where the marker images are located at an edge of the captured image, it is difficult to derive accurate gravity center coordinates of the marker images, and therefore a large noise variance tends to be derived.

Incidentally, it is certain that the degree of reliability of the position and the attitude which are estimated during the tracking processing (while the first estimating function is performed) is high. Thus, the noise deriving section 248 may set the variance of the noise of each of the estimated position and the estimated attitude to a small fixed value. For example, the noise deriving section 248 may set the variance of the position noise during the tracking processing to "0.5 mm" as a fixed value, and supply the set variance to the third estimation processing section 260. During the tracking processing, the first estimation processing section 240 may output the variances of the position noise and the attitude noise to the third estimation processing section 260 together with information regarding the estimated position and attitude. However, in a case where the variances of the position noise and the attitude noise are fixed values, the noise variances may be output to the third estimation processing section 260 once at a time of a start of the tracking processing, and the third estimation processing section 260 may store and use the noise variances.

The position and attitude estimation processing of the first estimation processing section 240 is performed in an imaging cycle of the images for the tracking of the input device 16 (60 frames/sec) (N in S20). When the application executing section 220 ends the execution of the application (game or the like), the position and attitude estimation processing of the first estimation processing section 240 is ended (Y in S20).

FIG. 10 illustrates an internal configuration of the estimation processing section 230. At time k, the first estimation processing section 240 outputs the estimated position and attitude as an "observed value $n_k$" and the variances of the position noise and the attitude noise as "observation noise $R_k$" to the third estimation processing section 260.

Observed Value $n_k$: an observation vector at time k

Observation Noise $R_k$: an error covariance matrix of the observed value at time k.

The second estimation processing section 250 reads a "state vector $m_{k-1|k-1}$" and an "estimation error $P_{k-1|k-1}$" a preceding time (at time k-1) from the state retaining section 226, and inputs the "state vector $m_{k-1|k-1}$" and the "estimation error $P_{k-1|k-1}$" to a predicting section. The state variable m in the embodiment includes the position, the speed, and the attitude of the input device 16, and may further include an acceleration bias and an angular velocity bias.

State Vector $m_{k-1|k-1}$: the state vector at time k−1 estimated on the basis of information up to time k−1

Estimation Error $P_{k-1|k-1}$: an estimation error covariance matrix of a state at time k−1 estimated on the basis of the information up to time k−1

In addition, the second estimation processing section 250 obtains an acceleration $a_k$ and an angular velocity $\omega_k$ of the input device 16 from the sensor data obtaining section 214, and inputs the acceleration $a_k$ and the angular velocity $\omega_k$ as "process input $l_k$" to the predicting section.

Acceleration $a_k$: acceleration at time k

Angular Velocity $\omega_k$: angular velocity at time k

Process Input $l_k$: a process input vector at time k

The second estimation processing section 250 calculates the variance of acceleration noise and the variance of angular velocity noise from the acceleration $a_k$ and the angular velocity $\omega_k$ and fixed noise parameters (including an axis shift, a scale shift, a value shift, and a bias shift), and inputs the variances as "process noise $Q_k$" to the predicting section.

Process Noise $Q_k$: an error covariance matrix of the process input at time k

The predicting section performs an integral operation on each of the acceleration $a_k$ and the angular velocity $\omega_k$, and performs an operation of calculating change amounts (that is, a position change amount, a speed change amount, and an attitude change amount) from the "state vector $m_{k-1|k-1}$," and adding the change amounts to the "state vector $m_{k-1|k-1}$." The predicting section calculates the speed change amount by integrating the acceleration $a_k$, calculates the position change amount by integrating a speed estimated by using the speed change amount, and calculates the attitude change amount by integrating the angular velocity $\omega_k$. The predicting section outputs the "state vector $m_{k|k-1}$" and the "estimation error $P_{k|k-1}$" to the third estimation processing section 260.

State Vector $m_{k|k-1}$: the state vector at time k estimated on the basis of the information up to time k−1

Estimation Error $P_{k|k-1}$: an estimation error covariance matrix of a state at time k estimated on the basis of the information up to time k−1

The third estimation processing section 260 obtains the "observed value $n_k$" and the "observation noise $R_k$" from the first estimation processing section 240, obtains the "state vector $m_{k|k-1}$" and the "estimation error $P_{k|k-1}$" from the second estimation processing section 250, and calculates a Kalman gain for correcting the "state vector $m_{k|k-1}$." The third estimation processing section 260 corrects the "state vector $m_{k|k-1}$" by using the Kalman gain, and outputs the "state vector $m_{k|k}$" and the "estimation error $P_{k|k}$."

State Vector $m_{k|k}$: the state vector at time k estimated on the basis of information up to time k Estimation Error $P_{k|k}$: an estimation error covariance matrix of the state at time k estimated on the basis of the information up to time k The "state vector $m_{k|k}$" represents the position, the speed, and the attitude estimated with high accuracy. The "state vector $m_{k|k}$" may be supplied to the application executing section 220, and used for operation in the application. The "state vector $m_{k|k}$" and the "estimation error $P_{k|k}$" are temporarily retained in the state retaining section 226, and are read at a time of estimation processing at time k+1 in the second estimation processing section 250.

In the estimation processing section 230, the estimation processing of the first estimation processing section 240 is performed in a cycle of 60 Hz, while the estimation processing of the second estimation processing section 250 is performed in a cycle of 800 Hz. Therefore, during a period from the output of the observed value by the first estimation processing section 240 to the output of a next observed value, the second estimation processing section 250 sequentially updates the state vector. During this period, the state vector is not corrected. The estimation processing section 230 in the embodiment performs a correcting step with the state at time k−1 immediately before the observation time k as a reference, that is, uses the observed value to correct the state in the past.

As described above, the estimation processing section 230 estimates the position and attitude of the input device 16 with high accuracy while the tracking processing of the input device 16 is performed. However, when the markers 30 of the input device 16 are not captured by the imaging device 14, the first estimation processing section 240 cannot perform the position and attitude estimation processing illustrated in FIG. 9.

In the embodiment, even in a case where the markers 30 of the input device 16 do not appear in the captured image (are not captured by the imaging devices 14), the estimation processing section 230 estimates the position of the input device 16, or in other words, continues the tracking of the input device 16 on the basis of the sensor data on the HMD 100 and the sensor data on the input device 16. For example, in a case of determining on the basis of the sensor data on the HMD 100 that the HMD 100 has moved in a right direction after the input device 16 goes outside the angle of view of the imaging devices 14, the estimation processing section 230 may move the estimated position of the input device 16 in a left direction from a previous position thereof by an amount corresponding to the movement of the HMD 100 in the right direction. The estimation processing section 230 ends the processing of estimating the position of the input device 16 in a case where a predetermined tracking ending condition (for example, the passage of a predetermined time, a large movement of the HMD 100, or the like) is satisfied under conditions where the markers 30 of the input device 16 do not appear in the captured image.

Returning to FIG. 8, the stillness determining section 262 determines whether or not the input device 16 is still on the basis of the sensor data indicating the acceleration of the input device 16, the sensor data being obtained by the sensor data obtaining section 214. The stillness determining section 262 calculates the slope of the acceleration from time series data on the acceleration of the input device 16, and determines whether or not the input device 16 is still on the basis of the calculated slope.

The stillness determining section 262 in the embodiment obtains a regression line by applying a least-square method to 100 acceleration values from the present time t to a past time (t−99), and identifies the slope of the regression line. Incidentally, the number of samples at a time of calculating the slope may be other than 100. The stillness determining section 262 may calculate the slope in a sampling cycle of the sensor data, and thereby determine at all times whether or not the input device 16 is still.

The stillness determining section 262 determines that the input device 16 is moving when the absolute value of the calculated slope is equal to or more than a predetermined threshold value Sth. The stillness determining section 262 determines that the input device 16 is still when the absolute value of the calculated slope is less than the threshold value Sth. Incidentally, in order to prevent frequent changing of a determination result, the stillness determining section 264 may determine that the input device 16 is still when the absolute value of the calculated slope is consecutively less than the threshold value Sth a predetermined number of times (N3 times), and after determining that the input device 16 is still, the stillness determining section 264 may determine that the input device 16 is moving when the absolute value of the calculated slope is consecutively equal to or more than the threshold value Sth a predetermined number of times (N4 times). N3 and N4 may be a same number of times and may be different numbers of times.

As a modification, the stillness determining section 262 may determine whether or not the input device 16 is still on the basis of the captured image in which the input device 16 appears, the captured image being obtained by the captured image obtaining section 212. As another modification, the stillness determining section 262 may determine whether or not the input device 16 is still on the basis of time series changes in the position of the input device 16 estimated by any one of the first estimation processing section 240, the second estimation processing section 250, and the third estimation processing section 260.

The captured image obtaining section 212 further provides the captured image data transmitted from the HMD 100 to the application executing section 220 and the image generating section 272. The sensor data obtaining section 214 further provides the sensor data transmitted from the HMD 100 to the application executing section 220 and the image generating section 272. In addition, the sensor data obtaining section 214 further provides the sensor data transmitted from the input device 16 to the application executing section 220 and the image generating section 272.

The operation information obtaining section 216 obtains the operation information indicating user operation input to the input device 16, the operation information being transmitted from the input device 16. The operation information obtaining section 216 provides the obtained operation information to the application executing section 220.

The application executing section 220 executes various kinds of applications on the basis of the operation information input from the operation information obtaining section 216, the sensor data input from the sensor data obtaining section 214, the position and attitude information of the input device 16 estimated by the estimation processing section 230 (for example, the third estimation processing section 260), and the like. For example, the application executing section 220 may make a VR game progress by executing a computer program that implements various kinds of processing related to the VR game. In the embodiment, the application executing section 220 executes an initial setting application of the HMD 100.

The image generating section 272 and the image output section 274 function as a display control section 276 that controls the display of electronic content on a display unit. The display unit includes at least the display panel 130 of the HMD 100, and may further include the display of the output device 15. In the embodiment, the display control section 276 displays a camera AR video to be described later on the display panel 130 of the HMD 100 during the execution of the initial setting application of the HMD 100.

Specifically, the image generating section 272 generates image data for display (for example, image data on VR content) to be displayed on the HMD 100 on the basis of the captured image data input from the captured image obtaining section 212, a result of execution of an application by the application executing section 220, and the like. The image output section 274 transmits the image data for display generated by the image generating section 272 to the HMD 100 to display the image data on the display panel 130 of the HMD 100.

In the embodiment, the image generating section 272 generates an image of the initial setting application of the HMD 100 on the basis of a result of execution of the initial setting application of the HMD 100 by the application executing section 220. The image of the initial setting application of the HMD 100 includes the captured image captured by the imaging devices 14 of the HMD 100, the captured image being obtained by capturing the real space in the front direction of the user wearing the HMD 100. Specifically, the image of the initial setting application of the HMD 100 includes an augmented reality (AR) video (hereinafter referred to also as a "camera AR video") on the basis of a video in which the real space in the front direction of the user wearing the HMD 100 appears. The image output section 274 displays the camera AR video generated by the image generating section 272 on the display panel 130 of the HMD 100.

The camera AR video can include an image of a virtual object (hereinafter referred to also as a "guide object") that assists in correctly gripping the input device 16. The guide object includes an approximate position guide and an insertion position guide to be described later. The image generating section 272 respectively and individually manages the state of the input device 16*a* and the state of the input device 16*b* (position and attitude or the like), and respectively and individually determines a guide object to be added to the input device 16*a* and a guide object to be added to the input device 16*b* in the camera AR video.

FIG. 11 illustrates an example of transitions of guide display in the camera AR video. The image generating section 272 sets the guide display for the input device 16 in a first mode, in a case where the estimation processing section 230 cannot track the position (for example, a coordinate value in a world coordinate system) of the input device 16. The first mode suppresses the display of the guide object added to the video of the input device 16, or in other words, sets the guide object in a non-display state.

In a case where the estimation processing section 230 can track the position of the input device 16, the image generating section 272 determines whether or not the input device 16 appears in the captured image captured by the imaging devices 14, that is, whether or not the input device 16 is in the field of view of the user. In addition, the image generating section 272 derives a distance between the HMD 100 and the input device 16 on the basis of the estimated position of the input device 16, and further determines whether or not the distance is equal to or less than a predetermined threshold value. This threshold value in the embodiment is 1.3 meters. However, an appropriate threshold value may be determined on the basis of the knowledge of a developer, an experiment using the information processing system 1, or the like.

The image generating section 272 sets the guide display for the input device 16 in a second mode when the input device 16 does not appear in the captured image captured by the imaging devices 14 or the distance between the HMD 100 and the input device 16 exceeds the above-described threshold value in a case where the position of the input device 16 can be tracked. The second mode disposes the approximate position guide as a guide object to be added to the video of the input device 16.

The image generating section 272 sets the guide display for the input device 16 in a third mode when the input device 16 appears in the captured image captured by the imaging devices 14 and the distance between the HMD 100 and the input device 16 is equal to or less than the above-described threshold value in a case where the position of the input device 16 can be tracked. The third mode disposes the approximate position guide, the insertion position guide, and an insertion direction guide as guide objects to be added to the video of the input device 16.

Figure 12:
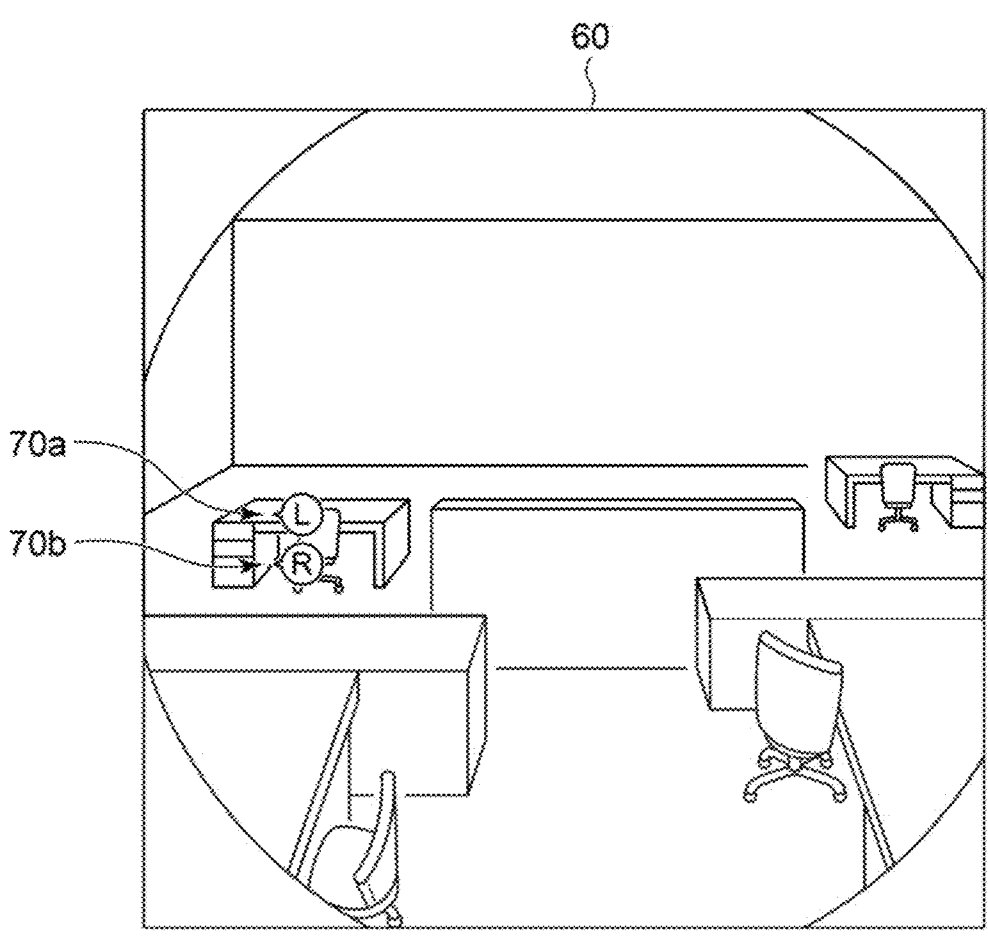
FIG. 12 is a diagram illustrating an example of the camera AR video.

FIG. 12 illustrates an example of a camera AR video 60. The figure illustrates the camera AR video 60 including the guide display in the second mode. In the initial setting of the HMD 100 in the embodiment, the user puts the HMD 100 on the head portion of the user himself/herself, and is thereafter requested to grip the input device 16. Here, suppose that both the position of the input device 16*a* and the position of the input device 16*b* can be tracked, but neither the input device 16*a* nor the input device 16*b* appears in the captured image captured by the imaging devices 14. The image generating section 272 generates the camera AR video 60 including the guide display in the second mode for each of the input device 16*a* and the input device 16*b*.

In the camera AR video 60 of FIG. 12, an approximate position guide 70*a* and an approximate position guide 70*b* are displayed so as to be superimposed on the captured image captured by the imaging devices 14. The approximate position guide 70*a* is a guide object that indicates a rough position of the input device 16*a* by the direction of an arrow. The approximate position guide 70*b* is a guide object that indicates a rough position of the input device 16*b* by the direction of an arrow. The image generating section 272 sets the arrow of the approximate position guide 70*a* so as to point to the position of the input device 16*a* estimated by the estimation processing section 230, and sets the arrow of the approximate position guide 70*b* so as to point to the position of the input device 16*b* estimated by the estimation processing section 230.

Figure 13:
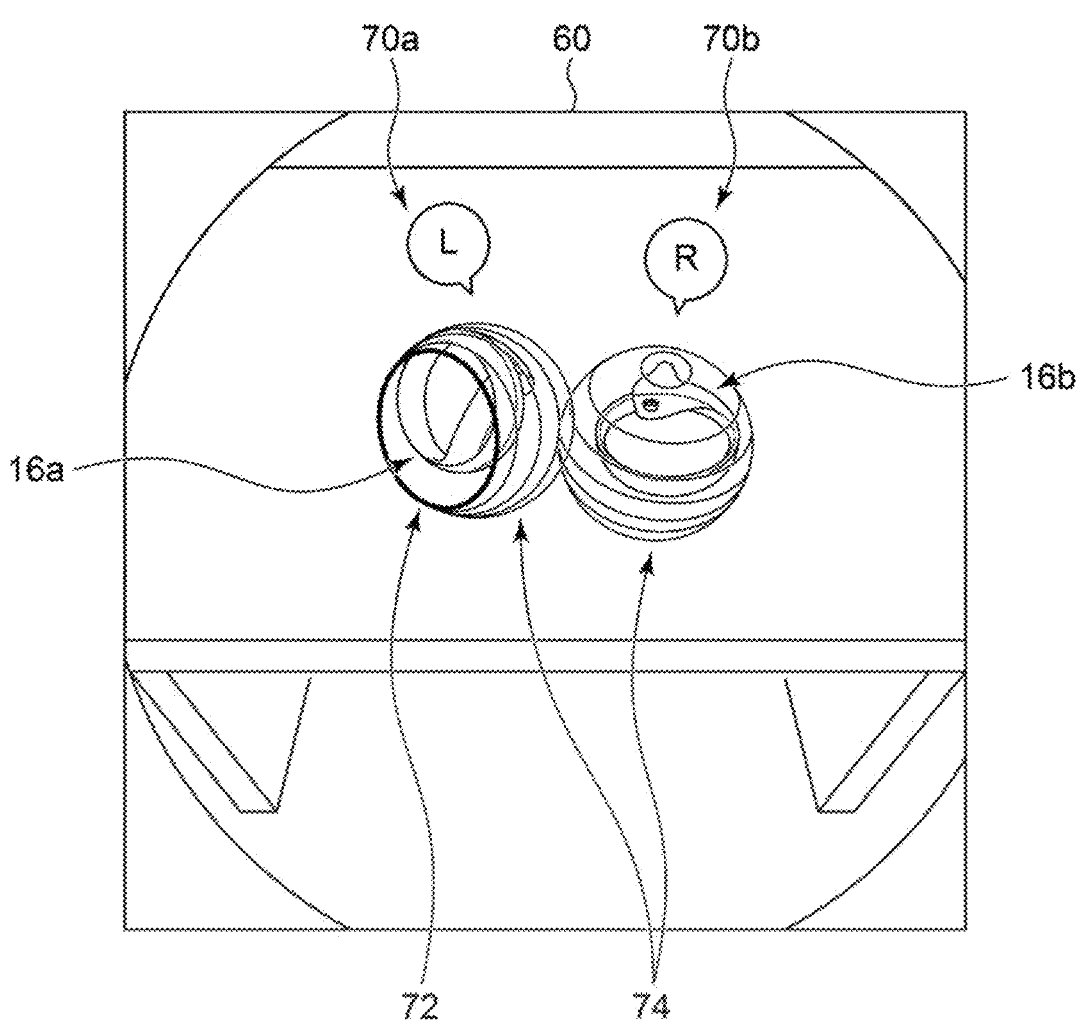
FIG. 13 is a diagram illustrating an example of the camera AR video.

FIG. 13 also illustrates an example of the camera AR video 60. The figure illustrates the camera AR video 60 including the guide display in the third mode. Suppose that the input device 16 (both the input device 16*a* and the input device 16*b* in this case) appears in the captured image captured by the imaging devices 14 during the guide display in the second mode, and that the distance between the HMD 100 and the input device 16 (both the input device 16*a* and the input device 16*b* in this case) has become equal to or less than 1.3 meters. In this case, the image generating section 272 generates the camera AR video 60 including the guide display in the third mode for each of the input device 16*a* and the input device 16*b*. In the camera AR video 60 of FIG. 13, an approximate position guide 70*a*, an approximate position guide 70*b*, an insertion position guide 72, and insertion direction guides 74 are displayed so as to be superimposed on the captured image captured by the imaging devices 14.

The insertion position guide 72 is an object as a first object for assisting the user in correctly gripping the controller, and is specifically an annular guide object that indicates a part through which the user is to insert a hand (that is, the position of the curved portion 23) in the input device 16. The image generating section 272 identifies the curved portion 23 of the HMD 100 appearing in the captured image on the basis of the position and the attitude of the HMD 100 estimated by the estimation processing section 230. The image generating section 272 disposes the insertion position guide 72 in the vicinity of the curved portion 23. Specifically, the image generating section 272 disposes the insertion position guide 72 so as to surround the periphery of the curved portion 23.

As a modification, the insertion position guide 72 may be an object that indicates a part that the user is to grip (that is, the position of the gripping portion 21) in the input device 16. The image generating section 272 may identify the gripping portion 21 of the HMD 100 appearing in the captured image on the basis of the position and attitude of the HMD 100 estimated by the estimation processing section 230. The image generating section 272 may dispose the insertion position guide 72 in the vicinity of the gripping portion 21. Specifically, the image generating section 272 may dispose the insertion position guide 72 to surround the periphery of the gripping portion 21.

Incidentally, in the camera AR video 64 of FIG. 13, the curved portion 23 of the input device 16*a* appears in the captured image, and therefore, the insertion position guide 72 is disposed in the vicinity of the curved portion 23 of the input device 16*a*. In contrast, the curved portion 23 of the input device 16*b* does not appear in the captured image, and therefore, no insertion position guide 72 is disposed for the input device 16*b*.

The insertion direction guides 74 are an annular guide object as a second object that moves in a direction in which the user is to insert a hand in the input device 16. The insertion direction guide 74 indicates the direction in which the user is to insert a hand in the input device 16 by movement thereof in the camera AR video. The insertion direction guide 74 may be a line thinner than the insertion position guide 72. The image generating section 272 identifies the curved portion 23 of the input device 16 appearing in the captured image and the direction in which to insert a hand (for example, a direction from the curved portion 23 to the gripping portion 21) on the basis of the position and the attitude of the input device 16 estimated by the estimation processing section 230.

In the embodiment, the image generating section 272 sets, in the camera AR video 64, an animation such that the insertion direction guide 74 moves on the periphery of the input device 16 in the direction from the curved portion 23 to the gripping portion 21. This animation may be such that a plurality of insertion direction guides 74 move sequentially in the direction from the curved portion 23 to the gripping portion 21. The image generating section 272 may increase the transmittance of the insertion direction guide 74 as the insertion direction guide 74 moves and approaches the gripping portion 21.

The image generating section 272 switches the guide display for the input device 16*a* from the third mode to the second mode in a case where the input device 16 ceases to appear in the captured image captured by the imaging devices 14 or the distance between the HMD 100 and the input device 16*a* exceeds 1.3 meters and the tracking of the input device 16*a* by the estimation processing section 230 is continued (the estimated value of the position of the input device 16*a* is output by the estimation processing section 230) while the guide display for the input device 16*a* is set in the third mode. In addition, when the tracking of the input device 16*a* by the estimation processing section 230 is ended, the image generating section 272 switches the guide display for the input device 16*a* from the second mode to the first mode. The same is true for the switching of the guide display for the input device 16*b*.

Returning to FIG. 11, the image generating section 272 generates a camera AR video switched to guide display in a fourth mode in a case where a non-stationary state of the input device 16 is continued for a first time (one second in the embodiment) or more during the guide display in the third mode, or in other words, in a case where the stillness determining section 262 continues to determine for the first time (one second in the embodiment) or more that the input device 16 is in a non-stationary state, during the guide display in the third mode. The switching from the guide display in the third mode to the guide display in the fourth mode typically occurs in a case where the user holds the input device 16 in a hand.

Figure 14:
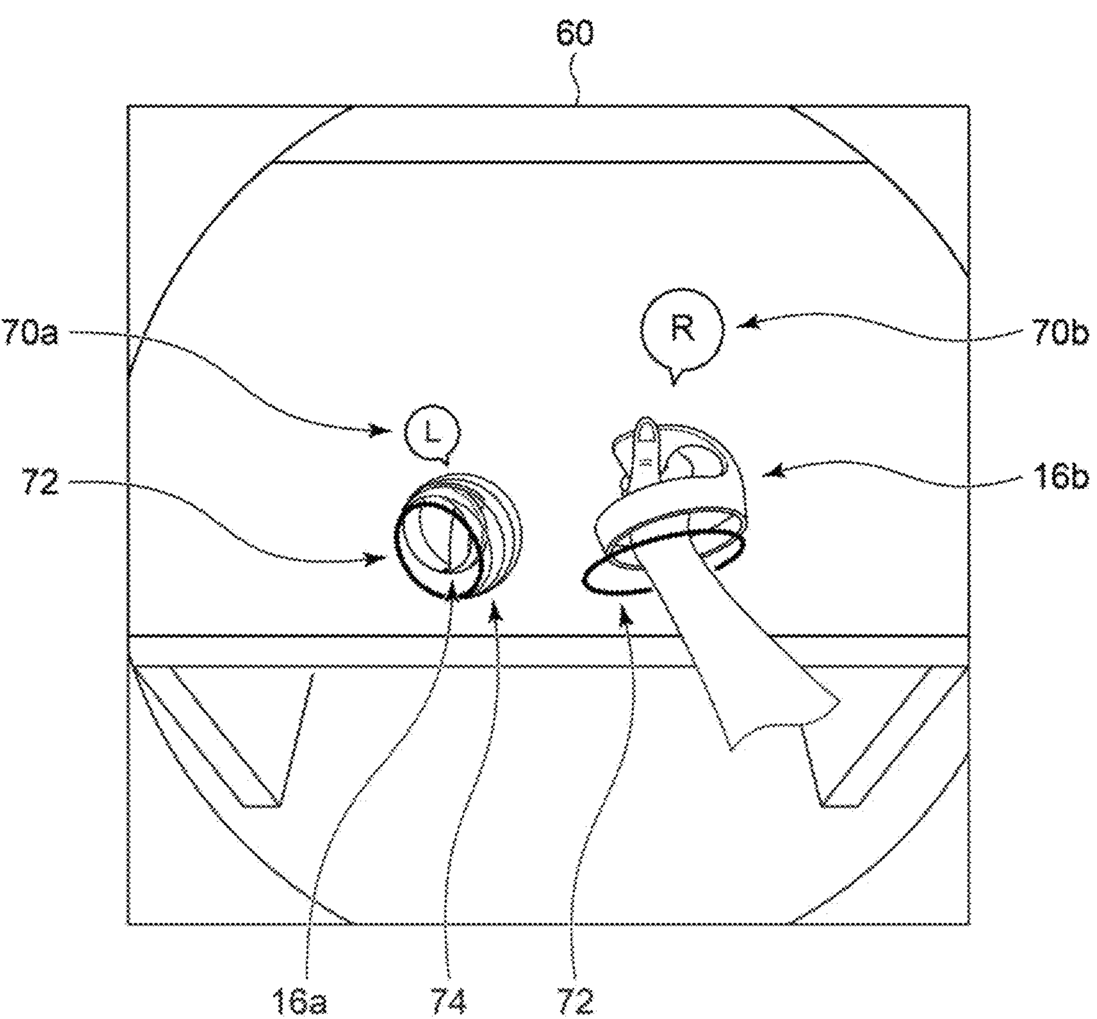
FIG. 14 is a diagram illustrating an example of the camera AR video.

FIG. 14 also illustrates an example of the camera AR video 60. In the camera AR video 60 of the figure, the guide display in the third mode is set for the input device 16*a* in a stationary state. In contrast, the guide display in the fourth mode is set for the input device 16*b* that is held in a hand by the user and thus set in a non-stationary state.

In the guide display in the fourth mode, the approximate position guide 70*b* and the insertion position guide 72 are displayed, whereas the insertion direction guide 74 is in a non-display state. In a case where the guide display for the input device 16*b* makes a transition from the third mode to the fourth mode, the image generating section 272 ends the animation of the insertion direction guide 74 added to the input device 16*b* thus far. This is because a distance between the user and the input device 16 becomes considerably shorter when the user holds the input device 16 in a hand and the user seeing the insertion direction guide 74 (animation) tends to be caused to have a feeling of strangeness when the insertion direction guide 74 (animation) is displayed in this state.

Returning to FIG. 11, in a case where contact of a finger of the user with any one of the operating members 22 of the input device 16 is detected during the guide display in the fourth mode, the image generating section 272 generates a camera AR video switched to guide display in a fifth mode. The guide display in the fifth mode erases all of the guide objects, or in other words, sets all of the guide objects in a non-display state.

Figure 15:
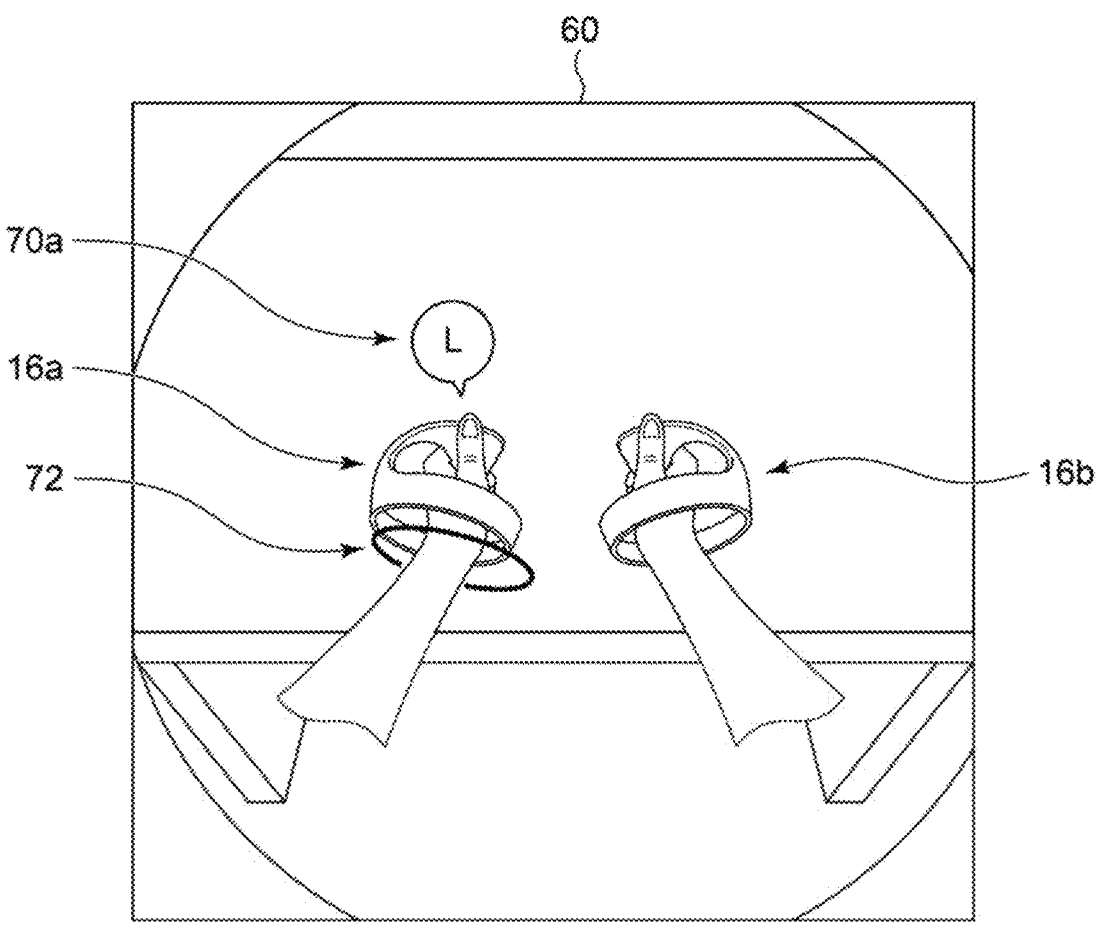
FIG. 15 is a diagram illustrating an example of the camera AR video.

FIG. 15 also illustrates an example of the camera AR video 60. In the camera AR video 60 in the figure, the guide display in the fourth mode is set for the input device 16*a* held in a hand by the user and thus set in a non-stationary state, and the approximate position guide 70*a* and the insertion position guide 72 are added to the input device 16*a*. In contrast, the guide display for the input device 16*b* whose operating member 22 is touched by a finger of the user has made a transition from the fourth mode to the fifth mode, so that the approximate position guide 70*b* and the insertion position guide 72 are set in a non-display state. The initial setting application of the HMD 100 may proceed to next setting processing (for example, processing of editing a play area or the like) using the input device 16*a* and the input device 16*b* in a case where fingers of the user touch both the input device 16*a* and the input device 16*b*.

When the finger of the user is separated from the operating member 22 while the guide display for the input device 16*a* is set in the fifth mode, the image generating section 272 switches the guide display for the input device 16*a* from the fifth mode to the fourth mode. In addition, the image generating section 272 switches the guide display for the input device 16*a* from the fourth mode to the third mode in a case where a stationary state of the input device 16*a* continues for a second time (10 seconds in the embodiment) or more, the second time being longer than the first time, or in other words, in a case where the stillness determining section 262 continues to determine for the second time (10 seconds in the embodiment) or more that the input device 16*a* is in a non-stationary state, while the guide display for the input device 16*a* is set in the fourth mode. The same is true for the guide display for the input device 16*b*.

That is, the image generating section 272 sets the insertion direction guide 74 in a non-display state when the non-stationary state of the input device 16 continues for a relatively short time, whereas the image generating section

272 resumes the display of the insertion direction guide 74 on condition that the stationary state of the input device 16 continues for a relatively long time. Thus, even in a case where the input device 16 is held unintentionally still while the user holds the input device 16 in a hand, or in other words, while the distance between the user and the input device 16 is considerably shorter, the insertion direction guide 74 is not easily displayed, and therefore, the user is not easily caused to have a feeling of strangeness.

The information processing system 1 in the embodiment presents, to the user, an AR image in which the insertion position guide 72 and the insertion direction guide 74 are added to the image obtained by capturing in the front direction of the user wearing the HMD 100. It is thereby possible to assist the user wearing the HMD 100 in correctly inserting a hand into the input device 16 and correctly gripping the input device 16.

The present invention has been described above on the basis of an embodiment thereof. The present embodiment is illustrative, and it is to be understood by those skilled in the art that combinations of constituent elements or processing processes are susceptible of various modifications and that such modifications also fall within the scope of the present invention.

The estimation processing section 230 of the information processing device 10 in the embodiment estimates the position and the attitude of the input device 16 on the basis of both the image obtained by capturing the input device 16 (in other words, the captured image in which the input device 16 appears) and the sensor data transmitted from the input device 16. As a modification, the estimation processing section 230 may use the image obtained by capturing the input device 16 as in the first estimation processing section 240 but may not use the sensor data transmitted from the input device 16 to estimate the position and the attitude of the input device 16. As another modification, the estimation processing section 230 may use the sensor data transmitted from the input device 16 as in the second estimation processing section 250 but may not use the image obtained by capturing the input device 16 to estimate the position and the attitude of the input device 16.

The functions of the information processing device 10 described in the embodiment may be implemented in the HMD 100. In other words, the HMD 100 may include the functions of the information processing device 10 described in the embodiment. Further, in other words, the information processing device 10 in the embodiment may be the HMD 100. In addition, in the embodiment, the imaging devices 14 are attached to the HMD 100. However, the imaging devices 14 may be attached to positions other than those of the HMD 100.

Any combinations of the embodiment and the modifications described above are also useful as embodiments of the present disclosure. New embodiments created by the combinations have combinations of the respective effects of the embodiment and the modifications. In addition, it is to be understood by those skilled in the art that functions to be performed by respective constituent elements described in claims are implemented by single bodies of the respective constituent elements illustrated in the embodiment and the modifications or cooperation of the constituent elements.

Technical ideas described in the foregoing embodiment and modifications thereof can be expressed as in aspects described in the following items.

[Item 1]

An information processing device including:

a captured image obtaining section configured to obtain a captured image resulting from capturing a front of a user wearing a head-mounted display;

an estimating section configured to estimate a position of a controller including a gripping portion to be gripped by the user on a basis of the captured image in which the controller appears; and a display control section configured to display the captured image resulting from capturing the front of the user on the head-mounted display;

the display control section being configured to further display a first object indicating a part to be gripped by the user together with the captured image on the basis of an estimation result of the position of the controller. According to the information processing device, it is possible to assist the user wearing the head-mounted display in correctly gripping the controller.

[Item 2]

The information processing device according to Item 1, in which the display control section further displays the first object indicating the part to be gripped in a vicinity of the gripping portion of the controller appearing in the captured image on the basis of the estimation result of the position of the controller.

According to the information processing device, it is possible to assist the user wearing the head-mounted display in correctly gripping the controller.

[Item 3]

The information processing device according to Item 1 or 2, in which the controller further includes a curved portion for insertion of a hand by the user, and the display control section displays the first object indicating a part through which to insert the hand in a vicinity of the curved portion of the controller appearing the captured image on the basis of the estimation result of the position of the controller. According to this aspect, the user wearing the head-mounted display can be assisted in correctly inserting the hand through the curved portion of the controller, and can therefore be assisted in correctly gripping the controller.

[Item 4]

The information processing device according to any one of Items 1 to 3, in which the display control section further displays a second object that moves in a direction in which to insert a hand in a vicinity of the controller appearing in the captured image.

According to this aspect, the user wearing the head-mounted display can be assisted in inserting the hand from the curved portion of the controller in a correct direction.

[Item 5]

The information processing device according to Item 4, in which the display control section sets the second object in a non-display state in a case where a non-stationary state of the controller continues for a first time or more. According to this aspect, it is possible to prevent the user from having a feeling of strangeness and to prevent checking a state of wearing the controller by the user from becoming difficult, when the display of the second object continues in a case where the user holds the controller in a hand.

[Item 6]

The information processing device according to Item 5, in which the display control section resumes the display of the second object in a case where a stationary state of the controller continues for a second time or more, the second time being longer than the first time, after the non-stationary state of the controller continues for the first time or more and the second object is set in a non-display state.

According to this aspect, by relatively lengthening a duration of the stationary state of the controller as a condition for resuming the display of the second object, it becomes easy to prevent resuming the display of the second object even though the controller is held in a hand.

[Item 7]

The information processing device according to any one of Items 1 to 6, in which the display control section displays the first object in a case where the controller appears in the captured image and a distance between the head-mounted display and the controller is equal to or less than a predetermined threshold value.

According to this aspect, the display of the first object is suppressed while the controller is located at a position distant from the user. The user is thereby easily prevented from misunderstanding as if the first object indicated another object present between the controller and the user.

[Item 8]

A controller display method performed by a computer, the controller display method including:

a step of obtaining a captured image resulting from capturing a front of a user wearing a head-mounted display;

a step of estimating a position of a controller including a gripping portion to be gripped by the user on a basis of the captured image in which the controller appears; and a step of displaying the captured image resulting from capturing the front of the user on the head-mounted display;

the displaying step further displaying a first object indicating a part to be gripped by the user together with the captured image on the basis of an estimation result of the position of the controller.

According to the controller display method, it is possible to assist the user wearing the head-mounted display in correctly gripping the controller.

[Item 9]

A computer program for making a computer implement: a function of obtaining a captured image resulting from capturing a front of a user wearing a head-mounted display;

a function of estimating a position of a controller including a gripping portion to be gripped by the user on the basis of the captured image in which the controller appears; and a function of displaying the captured image resulting from capturing the front of the user on the head-mounted display;

the displaying function further displaying a first object indicating a part to be gripped by the user together with the captured image on the basis of an estimation result of the position of the controller.

According to the computer program, it is possible to assist the user wearing the head-mounted display in correctly gripping the controller.

INDUSTRIAL APPLICABILITY

The present invention is applicable to an information processing device and an information processing system.

REFERENCE SIGNS LIST

1: Information processing system
10: Information processing device
14: Imaging device
16: Input device
21: Gripping portion
23: Curved portion
100: HMD
212: Captured image obtaining section
230: Estimation processing section
272: Image generating section
274: Image output section
276: Display control section

The invention claimed is:

1. An information processing device comprising:

one or more memory devices configured to store instructions; and one or more processors, that upon execution of the instructions, are configured to:

obtain a captured image resulting from capturing a front of a user wearing a head-mounted display;

estimate a position of a controller based on determining a respective position of a plurality of markers arranged on a surface of the controller, the controller including a gripping portion to be gripped by the user on a basis of the captured image in which the controller appears;

display the captured image resulting from capturing the front of the user on the head-mounted display;

display a first object indicating a part to be gripped by the user together with the captured image on a basis of an estimation result of the position of the controller; and display a second object that moves in a direction in which to insert a hand in a vicinity of the controller appearing in the captured image, wherein the one or more processors are further configured to set the second object in a non-display state in a case where a non-stationary state of the controller continues for a first time or more.

2. The information processing device according to claim 1, wherein the one or more processors are further configured to display the first object indicating the part to be gripped in a vicinity of the gripping portion of the controller appearing in the captured image on the basis of the estimation result of the position of the controller.

3. The information processing device according to claim 1, wherein the controller further includes a curved portion for insertion of the hand by the user, and wherein the one or more processors are further configured to display the first object indicating a part through which to insert the hand in a vicinity of the curved portion of the controller together with the captured image on the basis of the estimation result of the position of the controller.

4. The information processing device according to claim 1, wherein the one or more processors are further configured to resume the display of the second object in a case where a stationary state of the controller continues for a second time or more, the second time being longer than the first time, after the non-stationary state of the controller continues for the first time or more and the second object is set in the non-display state.

5. The information processing device according to claim 1, wherein the one or more processors are further configured to display the first object in a case where the controller appears in the captured image and a distance between the head-mounted display and the controller is equal to or less than a predetermined threshold value.

6. The information processing device of claim 1, wherein estimating the position of the controller further comprises:

determining, based on an arrangement of the plurality of markers, an observed value corresponding to the position of the controller;

determining, based on sensor data corresponding to a movement of the controller, an initial estimation of the position of the controller; and determining, based on the observed value and the initial estimation of the position of the controller, the estimation result of the position of the controller.

7. The information processing device of claim 6, wherein estimating the position of the controller further comprises:

determining, based on an estimation error corresponding to the initial estimation of the position of the controller, a Kalman gain; and determining the estimation result of the position of the controller based on correcting the initial estimation of the position of the controller using the Kalman gain.

8. The information processing device of claim 1, wherein the one or more processors are further configured to, subsequent to displaying the first object:

adjust the first object to the non-display state based on contact of the user with the controller being detected.

9. The information processing device of claim 1, wherein the plurality of markers comprises one or more light sources configured to emit light in association with the plurality of markers.

10. A controller display method performed by a computer, the controller display method comprising:

obtaining a captured image resulting from capturing a front of a user wearing a head-mounted display;

estimating a position of a controller based on determining a respective position of a plurality of markers arranged on a surface of the controller, the controller including a gripping portion to be gripped by the user on a basis of the captured image in which the controller appears; and displaying the captured image resulting from capturing the front of the user on the head-mounted display;

displaying a first object indicating a part to be gripped by the user together with the captured image on a basis of an estimation result of the position of the controller; and displaying a second object that moves in a direction in which to insert a hand in a vicinity of the controller appearing in the captured image, wherein displaying the second object further comprises setting the second object in a non-display state in a case where a non-stationary state of the controller continues for a first time or more.

11. The controller display method of claim 10, wherein estimating the position of the controller further comprises:

determining, based on an arrangement of the plurality of markers, an observed value corresponding to the position of the controller;

determining, based on sensor data corresponding to a movement of the controller, an initial estimation of the position of the controller; and determining, based on the observed value and the initial estimation of the position of the controller, the estimation result of the position of the controller.

12. The controller display method of claim 11, wherein estimating the position of the controller further comprises:

determining, based on an estimation error corresponding to the initial estimation of the position of the controller, a Kalman gain; and determining the estimation result of the position of the controller based on correcting the initial estimation of the position of the controller using the Kalman gain.

13. The controller display method of claim 10, further comprising, subsequent to displaying the first object:

detecting contact of the user with the controller; and in response to detecting the contact of the user with the controller, adjusting the first object to the non-display state.

14. The controller display method of claim 10, wherein the plurality of markers comprises one or more light sources to emit light in association with the plurality of markers.

15. A non-transitory computer-readable storage medium comprising a computer program for a computer, which when executed by a processor, causes the processor to perform one or more operations comprising:

obtaining a captured image resulting from capturing a front of a user wearing a head-mounted display;

estimating a position of a controller based on determining a respective position of a plurality of markers arranged on a surface of the controller, the controller including a gripping portion to be gripped by the user on a basis of the captured image in which the controller appears;

displaying the captured image resulting from capturing the front of the user on the head-mounted display;

displaying a first object indicating a part to be gripped by the user together with the captured image on a basis of an estimation result of the position of the controller; and displaying a second object that moves in a direction in which to insert a hand in a vicinity of the controller appearing in the captured image, wherein displaying the second object further comprises setting the second object in a non-display state in a case where a non-stationary state of the controller continues for a first time or more.

16. The non-transitory computer-readable storage medium of claim 15, wherein estimating the position of the controller further comprises:

determining, based on an arrangement of the plurality of markers, an observed value corresponding to the position of the controller;

determining, based on sensor data corresponding to a movement of the controller, an initial estimation of the position of the controller; and determining, based on the observed value and the initial estimation of the position of the controller, the estimation result of the position of the controller.

17. The non-transitory computer-readable storage medium of claim 16, wherein estimating the position of the controller further comprises:

determining, based on an estimation error corresponding to the initial estimation of the position of the controller, a Kalman gain; and determining the estimation result of the position of the controller by correcting the initial estimation of the position of the controller using the Kalman gain.

18. The non-transitory computer-readable storage medium of claim 15, wherein the operations further comprise, subsequent to displaying the first object:

detecting contact of the user with the controller; and in response to detecting the contact of the user with the controller, adjusting the first object to the non-display state.

* * * * *